US010866726B2

(12) United States Patent
Hong et al.

(10) Patent No.: US 10,866,726 B2
(45) Date of Patent: Dec. 15, 2020

(54) IN-VEHICLE TOUCH DEVICE HAVING DISTINGUISHABLE TOUCH AREAS AND CONTROL CHARACTER INPUT METHOD THEREOF

(71) Applicant: HYUNDAI MOTOR COMPANY, Seoul (KR)

(72) Inventors: Gi Beom Hong, Bucheon-si (KR); Jungsang Min, Seoul (KR); Jeong-Eom Lee, Yongin-si (KR); Sihyun Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 511 days.

(21) Appl. No.: 14/941,352

(22) Filed: Nov. 13, 2015

(65) Prior Publication Data

US 2017/0024117 A1 Jan. 26, 2017

(30) Foreign Application Priority Data

Jul. 21, 2015 (KR) ........................ 10-2015-0103000

(51) Int. Cl.
*G06F 3/0354* (2013.01)
*G06F 3/0488* (2013.01)
*G06F 40/166* (2020.01)

(52) U.S. Cl.
CPC ...... *G06F 3/04883* (2013.01); *G06F 3/03547* (2013.01); *G06F 40/166* (2020.01)

(58) Field of Classification Search
CPC ............... G06F 3/04817; G06F 3/0482; G06F 3/04883; G06F 3/0485
See application file for complete search history.

(56) References Cited

U.S. PATENT DOCUMENTS

| 8,115,749 | B1* | 2/2012 | Simpson | G06F 3/04886 345/173 |
| 2002/0093328 | A1* | 7/2002 | Maatta | G06F 1/1616 324/207.11 |
| 2006/0279554 | A1* | 12/2006 | Shin | G06F 3/03547 345/173 |
| 2007/0152983 | A1* | 7/2007 | McKillop | G06F 3/03547 345/173 |
| 2009/0153374 | A1* | 6/2009 | Maw | G06F 3/0238 341/27 |
| 2013/0113726 | A1 | 5/2013 | Tovar et al. | |
| 2014/0195985 | A1* | 7/2014 | Yoon | G06F 17/24 715/856 |

(Continued)

FOREIGN PATENT DOCUMENTS

JP 2008-049817 A 3/2008
KR 10-2006-0125468 A 12/2006

(Continued)

*Primary Examiner* — Rinna Yi
(74) *Attorney, Agent, or Firm* — Morgan, Lewis & Bockius LLP

(57) ABSTRACT

A touch input device and control method thereof, wherein the touch input device includes a swiping input unit configured to receive a selection of a character through a swiping gesture by a user, a gesture input unit placed on an area different from that of the swiping input unit and in which a user inputs a gesture trough a touch, and a controller configured to determine that the selected character is input when a touch gesture is input from the swiping input unit to the gesture input unit.

13 Claims, 25 Drawing Sheets

(56) References Cited

U.S. PATENT DOCUMENTS

| | | | |
|---|---|---|---|
| 2015/0040056 A1* | 2/2015 | Cho | G06F 3/018 715/773 |
| 2015/0160856 A1* | 6/2015 | Jang | G06F 3/04886 715/773 |
| 2015/0248235 A1* | 9/2015 | Offenberg | G06F 3/04886 715/773 |

FOREIGN PATENT DOCUMENTS

| | | |
|---|---|---|
| KR | 10-2008-0055079 A | 6/2008 |
| KR | 10-2011-0058312 A | 6/2011 |
| KR | 10-2011-0077113 A | 7/2011 |
| KR | 10-1130511 B1 | 3/2012 |
| KR | 10-2013-0071013 A | 6/2013 |
| KR | 10-1510013 B1 | 4/2015 |

* cited by examiner

IN-VEHICLE TOUCH DEVICE HAVING DISTINGUISHABLE TOUCH AREAS AND CONTROL CHARACTER INPUT METHOD THEREOF

CROSS-REFERENCE TO RELATED APPLICATION(S)

This application claims the benefit of priority of Korean Patent Application No. 10-2015-0103000, filed on Jul. 21, 2015 in the Korean Intellectual Property Office, the disclosure of which is incorporated herein by reference.

BACKGROUND

1. Field

Embodiments of the present disclosure relate to a touch input device capable of receiving a character input by a user, and a control method of the same.

2. Description of Related Art

In general, various electronic devices have been produced through the development of electronic communication technology, and there is a tendency that miniaturized design together with convenience of operation is emphasized in such electronic devices. In accordance with the tendency, it may be emphasized that input devices, represented by a key board or a key pad, are diverse.

A touch input device may be an input device configured to compose an interface between communication equipment by using a variety of display devices, and a user, and may allow the interface between communication equipment and the user to be performed when a user directly touches or comes close to a touch pad or a touch screen by using an input tool such as a finger or a touch pen.

Since the touch input device is easily used by all ages through a simple contact to an input tool, such as a finger or a touch pen, the touch input device may be used in various devices, such as Automated Teller Machine (ATM), Personal Digital Assistant (FDA), and mobile phone, and in various field, such as banks, government offices, tourism and traffic guidance.

In recent years, there is an effort to apply the touch input device to health medical related products and a vehicle. The touch input device may be implemented in a touch screen or may be used separately from the display device, and thus the utilization of the touch input device may be increased.

SUMMARY

Therefore, it is an aspect of the present disclosure to provide a touch input device capable of inputting characters easily while a user looks at the front or a screen by using touch input and reducing an error rate in inputting a character, and a control method of the same.

It is another aspect of the present disclosure to provide a touch input device capable of improving a sense of operation or a sense of touch of a user when the user inputs a character by operation the touch input device, and a control method of the same.

Additional aspects of the present disclosure will be set forth in part in the description which follows and, in part, will be obvious from the description, or may be learned by practice of the present disclosure.

In accordance with one aspect of the present disclosure, a touch input device includes a swiping input unit configured to receive a selection of a character through a swiping gesture by a user, a gesture input unit placed on an area different from the swiping input unit and in which a user inputs a gesture trough a touch, and a controller configured to determine that the selected character is input when a touch gesture is input from the swiping input unit to the gesture input unit.

The gesture input unit may be disposed on the center, and the swiping input unit may be disposed on an edge portion, of the gesture input unit.

The controller may determine that the selected character is input when a flicking gesture is input from the swiping input unit to the gesture input unit.

The touch input device may further include a display device configured to display a character input from a user.

The swiping input unit may receive a selection of a character corresponding to an end point of a swiping gesture input from a user.

The touch input device may further include a display device configured to arrange a character capable of being input from a user, on a swiping display area.

The display device may display the selected character to be highlighted on the swiping display area.

The controller may delete an input character when a gesture is input from the gesture input unit to the swiping input unit.

The touch input device may further include a display device, wherein the gesture input unit may receive an input of flicking gesture from a user, and the controller may move a cursor displayed on the display device according to a direction of the flicking gesture input to the gesture input unit.

The controller may replace an input character with a character corresponding to the swiping gesture when the flicking gesture is input from the gesture input unit to the swiping input unit and then when the swiping gesture is input to the swiping input unit.

The gesture input unit may include a concave shape.

The gesture input unit may be provided to be of a circular shape, and the swiping input unit may be provided to surround a circumference of the gesture input unit.

The swiping input unit may be provided to be inclined downward.

The swiping input unit may include a plurality of scales formed to be engraved or embossed.

In accordance with another aspect of the present disclosure, a control method of a touch input device includes an operation in which a swiping input unit receives a selection of a character through a swiping gesture from a user, an operation of receiving a touch gesture, which is performed from a swiping input unit to a gesture input unit, which is disposed on an area different from that of the swiping input unit and in which a user inputs a gesture by touch, and an operation of determining whether the selected character is input.

The control method may further include an operation of displaying a character determined to be input, on a display device.

The operation of displaying may include an operation of arranging characters capable of being input and displaying the selected character to be highlighted, and an operation of displaying separately the character determined to be input from the arranged character.

The control method may further include an operation of receiving an input a gesture from the gesture input unit to the swiping input unit, and an operation of deleting the input character.

The control method may further include an operation of receiving an input a gesture performed from the gesture input unit to the swiping input unit, an operation of selecting another character corresponding to another swiping gesture when the swiping input unit receives another swiping gesture, an operation of receiving an input of another gesture performed from the swiping input unit to the gesture input unit, and an operation of replacing an input character with another character.

The control method may further include an operation in which the gesture input unit receives an input of a flicking gesture, and an operation of moving a cursor displayed on a display device, according to a direction of the flicking gesture.

The operation of receiving a selection of a character may include an operation in which the swiping input unit receives an input of a swiping gesture and an operation of moving a cursor displayed on a display device, according to a direction of the swiping gesture.

The control method may further include an operation of storing an input character.

BRIEF DESCRIPTION OF THE DRAWINGS

These and/or other aspects of the disclosure will become apparent and more readily appreciated from the following description of embodiments, taken in conjunction with the accompanying drawings of which:

FIG. 4 is a view of inputting a gesture, FIG. 5 is a view of inputting swiping, and FIG. 6 is a view of inputting tap;

DETAILED DESCRIPTION

Figure 1:
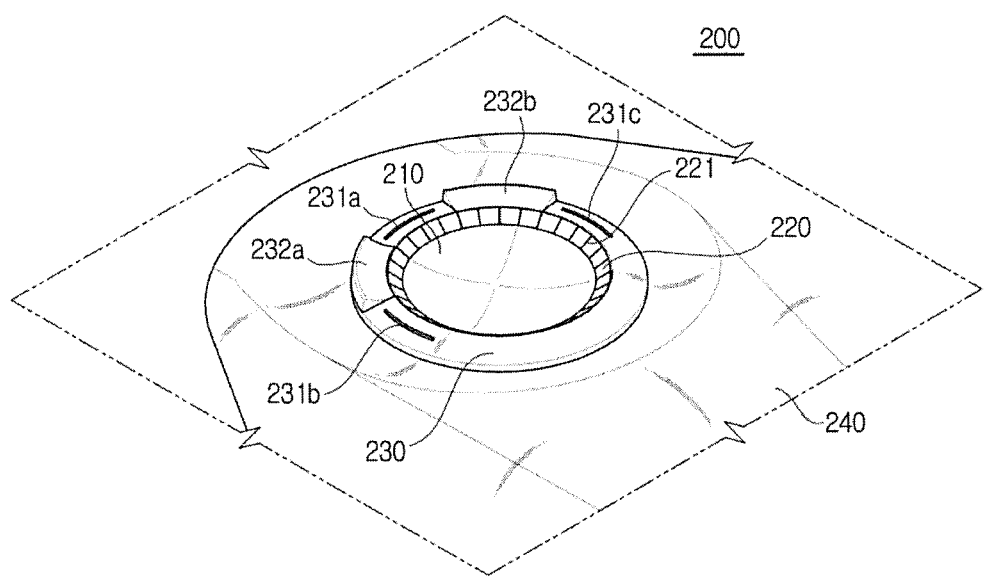
FIG. 1 is a perspective view of a touch input device in accordance with a first embodiment in the present disclosure.

In case of adding a reference numeral to components of each drawing, it may be noted that the same component has the same reference numeral although shown in other drawing. If it is determined that a detailed description of commonly-used technologies or structures related to the embodiments of the present disclosure may unnecessarily obscure the subject matter of the present disclosure, the detailed description will be omitted. Further, in the following detailed description, names of constituents, which are in the same relationship, are divided into "the first", "the second", and the like, but the present disclosure is not limited to the order in the following description.

Reference will now be made in detail to embodiments of the present disclosure, examples of which are illustrated in the accompanying drawings.

FIG. 1 is a perspective view of a touch input device in accordance with a first embodiment in the present disclosure.

A touch input device 200 in accordance with a first embodiment may include a gesture input tool configured to input a gesture by a touch from a user. The gesture input tool may include a gesture input unit 210 disposed on the center of the gesture input tool and a swiping input unit 220 disposed in an edge of the gesture input unit 210. The swiping input unit 220 may represent a portion where a swiping gesture is input, and "swipe" may represent inputting a gesture while a pointer is kept in touch with a touch pad.

The touch input device 200 may include a touch unit 210 and 220 configured to receive an input of a gesture from a user, and an edge unit 230 surrounding the touch unit 210 and 220.

The touch unit 210 and 220 may be a touch pad in which a signal is inputted when a user touches or closes by using a pointer, such as a finger or a touch pen. The user may input a desired instruction or a command by inputting a predetermined touch gesture to the touch unit 210 and 220.

Regardless of the name of touch pad, the touch pad may include a touch film, or a touch sheet including a touch sensor. The touch pad may include a touch panel, which is a display device provided with a touchable screen.

Meanwhile, recognizing a position of the pointer in a state in which the pointer is adjacent to the touch pad without touching the touch pad may be referred to as "proximity touch," and recognizing a position of the pointer in a state in which the pointer is touched on the touch pad may be referred to as "contract touch." A position where proximity touch occurs may be a position vertically corresponding to the pointer with respect to the touch pad when the pointer is close to the touch pad.

The touch pad may use resistive technology, optical technology, capacitive technology, ultrasound technology and pressure technology, but is not limited thereto. Any well known technology may be used for the touch pad.

The edge unit 230 may represent a portion surrounding the touch unit 210 and 220, and may be provided by a member, which is separated from the touch unit 210 and 220. In the edge unit 230, key buttons 232a and 232b or touch buttons 231a, 231b, and 231c surrounding the touch unit 210 and 220 may be provided. That is, a user may input a gesture to the touch unit 210 and 220, and may input a signal by using the buttons 231 and 232 provided in the edge unit 230 in the surround of the touch unit 210 and 220.

The touch input device 200 according to a first embodiment may further include a wrist supporting member 240 disposed to a lower portion of the gesture input tool to support a user's wrist. At this time, the wrist supporting member 240 may be disposed to be higher than the touch unit 210 and 220, that is a gesture input tool. The wrist may be prevented from being bent when the user touches the touch unit 210 and 220 in a state of supporting the wrist supporting member 240. Accordingly, while preventing muscloskeletal disease, more comfortable sense of operation to a user may be provided.

Figure 2:
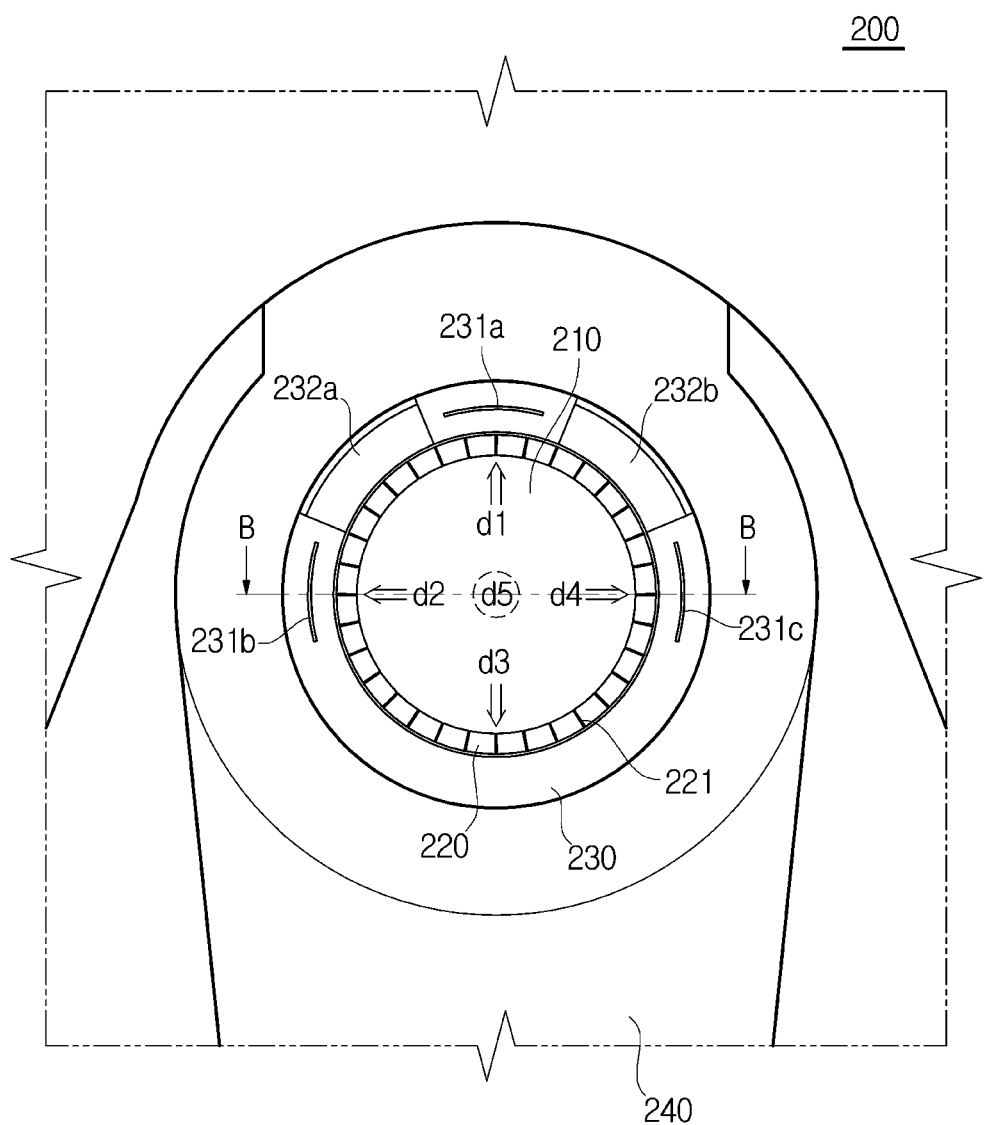
FIG. 2 is a plane view of a touch input device in accordance with a first embodiment in the present disclosure.
Figure 3:
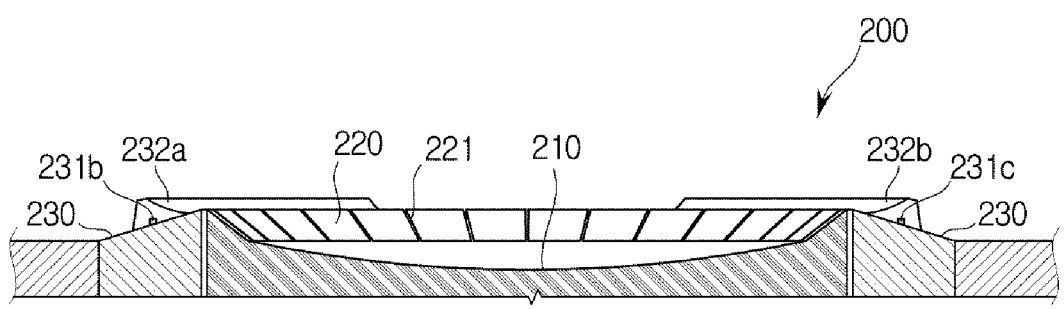
FIG. 3 is a cross-sectional view taken along line B-B' of FIG. 2.

FIG. 2 is a plane view of a touch input device in accordance with a first embodiment in the present disclosure and FIG. 3 is a cross-sectional view taken along line B-B' of FIG. 2.

The touch unit 210 and 220 may include a lower portion than the boundary of the edge unit 230. That is, a touch area of the touch unit 210 and 220 may be provided to be lower than the boundary line between the touch unit 210 and 220, and the edge unit 230. For example, the touch area may be provided to be inclined downward from the boundary line of the edge unit 230 or to have a step from the boundary line of the edge unit 230. In addition, the touch unit 210 and 220 according to a first embodiment as illustrated in FIG. 3 may include a curved surface portion 210 including a concave surface shape.

Since the touch area of the touch unit 210 and 220 includes a lower portion than the boundary line of the edge unit 230, a user may recognize the area and the boundary of the touch unit 210 and 220 by its tactility. When a gesture is inputted in the center portion of the touch unit 210 and 220, recognition rate may be increased. In addition, although a similar gesture is inputted, when a gesture is inputted in a different place, there may be a risk that the gesture is recognized as a different command. This risk may occur when a user inputs a gesture without looking at the display device. When a user can intuitively recognize the center and the edge by tactility in a state in which a user inputs a gesture when looking at the display device or focusing on the outside condition, the user may input a gesture to an accurate position. Accordingly, the input accuracy of the gesture may be improved.

The touch unit 210 and 220 may have a concave shape. The concave shape may represent a dent or a recessed shape, and may include a dent shape to be inclined or to have a step as well as a dent shape to be circle.

For example, the touch unit 210 and 220 may include a concave surface shape.

The curved surface portion 210 according to a first embodiment may be a concave surface having a certain curvature. The curvature of the curbed surface portion 210 may vary according to a portion of the touch unit 210 and 220. For example, the curvature of the center may be small, that is the radius of curvature of the center may be large, and the curvature of the edge may be large, that is the radius of curvature of the edge may be small.

The touch unit 210 and 220 may include a curved surface, and thus when inputting a gesture, a sense of touch or a sense of operation, which is felt by the user, may be improved. The curved surface of the curved surface portion 210 may be provided to be similar with a trajectory which is made by a movement of the end of the finger when a person moves the finger or rotates or twists a wrist with stretching the finger, in a state in which a person fixes her/his wrist.

In comparison with conventional plane touch unit, the touch unit 210 and 220 having a concave surface may be formed in an ergonomic manner.

That is, stress applied to a wrist may be reduced as well a sense of operation of a user may be improved. In addition, in comparison with a case of inputting a gesture to a plane touch unit, input accuracy may be enhanced.

The touch area of the touch unit 210 and 220 may be formed in a circular shape. When the touch unit 210 and 220 is provided in a circular shape, a concave surface may be easily formed. In addition, since the touch unit 210 and 220 is formed in a circular shape, a user may detect the touch area of the circular touch unit 210 and 220 by its tactility and thus a user may easily input a rolling or a spin gesture.

Since the touch unit 210 and 220 has a curved surface, a user may intuitively recognize that a finger is placed in which position of the touch unit 210 and 220. The touch unit 210 and 220 may have a curved surface so that an inclination may vary according to a portion of the touch unit 210 and 220. Therefore, the user may intuitively recognize that a finger is placed in which position of the touch unit 210 and 220 through a sense of inclination, which is felt through the finger.

Accordingly, when the user inputs a gesture to the touch unit 210 and 220 in a state in which the user stares at a point besides the touch unit 210 and 220, a feedback related to a position of the touch unit 210 and 220 where the finger is placed may be provided to help the user to input a needed gesture, and may improve the input accuracy of gesture.

A touch pad used in the touch unit 210 and 220 provided in a curved surface may recognize a touch by using optical technology. For example, on a rear surface of the curved touch unit 210 and 220, Infrared Light Emitting Diode (IR LED) and photodiode array may be disposed. The IR LED and photodiode array may acquire an infrared image reflected by a finger, and a controller may extract a touch point from the acquired image.

The diameter and depth of the touch unit 210 and 220 may be formed in an ergonomic manner. For example, a diameter of the touch unit 210 and 220 may be selected to be from approximately 50 mm to approximately 80 mm.

Given the average length of a finger of an adult, a range of the finger, which is made by the natural movement of the finger at a time in a state of fixing a wrist, may be selected within approximately 80 mm. Therefore, in a state of in which a diameter of the touch unit 210 and 220 is larger than approximately 80 mm, a hand may be unnaturally moved and a wrist may be excessively used when a user draws a circle in the inclined portion 220.

In contrast, when a diameter of the touch unit 210 and 220 is less than approximately 50 mm, an area of the touch area may be reduced and thus a diversity of input gesture may be reduced. In addition, the gesture may be made in a narrow area and thus gesture input errors may be increased.

In addition, when the touch unit 210 and 220 may be provided in a spherical surface, a value acquired by dividing a depth of the touch unit 210 and 220 by a diameter may be selected from approximately 0.04 to approximately 0.1. The value acquired by dividing a depth of the touch unit 210 and 220 by a diameter may represent a degree of bend of a curved surface of the touch unit 210 and 220. That is, in the same diameter, as a value acquired by dividing a depth of the touch unit 210 and 220 by a diameter is larger, the curved surface of the touch unit 210 and 220 may have a more concave shape, and in contrast, as a value acquired by dividing a depth of the touch unit 210 and 220 by a diameter is smaller, the curved surface of the touch unit 210 and 220 may have flatter shape.

Particularly, when a value acquired by dividing a depth of the touch unit 210 and 220 by a diameter is larger than approximately 0.1, the curvature of the concave shape may be large and thus user's sense of touch may become uncomfortable. Therefore, it may be appropriate that the curved surface of the touch unit 210 and 220 is identical to the curvature of a curved line, which is drawn by the end of the finger in the natural movement of the user's finger. However, when the value acquired by dividing a depth of the touch unit 210 and 220 by a diameter is larger than approximately 0.1, an excessive force may be applied to the finger when a user moves the finger along the curved surface. Accordingly, the user may feel an artificial sense of operation. In addition, when the user unconsciously and naturally moves the finger, the end of the finger may be separated from the curved surface. Accordingly, a touch of gesture may be discontinued and thus a recognition error may occur.

When the depth of the touch unit 210 and 220 is too low, it may be difficult for a user to feel a feature of the curved surface in comparison with that of a flat surface. When the value, acquired by dividing a depth of the touch unit 210 and 220 by a diameter is less than approximately 0.04, a user may hardly feel a difference in a sense of operation between drawing a gesture on the curved surface and drawing a gesture on a flat surface.

The touch unit 210 and 220 according to a first embodiment may include an inclined portion 220 inclined downwardly along an edge of the curved surface portion 210. When the touch unit 210 and 220 is provided in a circular shape, the curved surface portion 210 may have a shape of a part of spherical surface, and the inclined portion 220 may be provided to surround a circumference of the curved surface portion 210.

The inclined portion 220 may operate as a swiping input unit 220. For example, a user may input a swiping gesture along the inclined portion 220 provided in a circular shape. The user may input a swiping gesture along the inclined portion 220 clockwise, or counterclockwise.

A swiping gesture may be recognized as a different gesture by changing a start point and an end point of the swiping gesture. That is, a swiping gesture input in the inclined portion 220 placed in the left side of the curved surface portion 210 and a swiping gesture input in the inclined portion 220 placed in the right side of the curved surface portion 210 may lead to functions different from each other. In addition, in a state in which a user inputs a swiping gesture by contact to the same point using the finger, when an end point of the gesture, that is a position where the finger is off, is different, the gesture may be recognized differently from others.

The inclined portion 220 may receive an input of a tap gesture. A user may input various commands and instructions according to a position of the inclined portion 220 on which the user taps.

The inclined portion 220 may include scales 221. The scale 221 may inform a relative position to a user by tactility. For example, the scale 221 may be provided to be engraved or embossed. Each of the scale 221 may be disposed with a certain distance. Therefore, the user may intuitively recognize the number of the scale 221 passed by the finger during a swiping, and thus the user may accurately adjust the distance of swiping gesture.

According to a first embodiment, a cursor displayed on the display device may be moved according to the number of the scale 221 passed by the finger during a swiping gesture. In a state in which various characters are consecutively disposed on the display device, a selected character may be moved by a space to the next each time the user passes a single scale 221 while performing a swiping The inclination of the inclined portion 220 according to a first embodiment may be provided to have larger inclination than tangential inclination of the curved surface portion 220 in the boundary between the inclined portion 220 and the curved surface portion 210. When a user inputs a gesture in the curved surface portion 210, the user may intuitively recognize the touch area of the curved surface portion 210 since the inclination of the inclined portion 220 is larger than that of the curved surface portion 210. Meanwhile, while a gesture is input to the curved surface portion 210, a touch of the inclined portion 220 may be not recognized. Therefore, although the user reaches the boundary of the inclined portion 220 during inputting the gesture to the curved surface portion 210, a gesture input to the curved surface portion 210 and a swiping gesture input to the inclined portion 220 may be not be overlapped.

According to a first embodiment, the touch unit 210 and 220 may be provided in such a way that the curved surface portion 210 and the inclined portion 220 are integrally formed. The curved surface portion 210 and the inclined portion 220 may be provided with each touch sensor, or a single touch sensor. When the curved surface portion 210 and the inclined portion 220 are provided with a single touch sensor, the controller may distinguish the touch area of the curved surface portion 210 from the touch area of the inclined portion 220 and thus may distinguish between a gesture input signal of the curved surface portion 210 that is a gesture input unit, from a gesture input signal of the inclined portion 220 that is a swiping input unit.

The touch input device 200 may further include a button input tool 231 and 232. The touch input tool 231 and 232 may be disposed around the touch unit 210 and 220. A user may make an operation command rapidly by operating the button 231 and 232 without changing a hand position while inputting a gesture.

The button input tool 231 and 232 may include a touch button 231*a* 231*b*, and 231*c* performing a pre-determined function by a user's touch, or a pressure button 232*a* and 232*b* performing a pre-determined function while a position is changed by an external force from a user. When the touch button 231*a* 231*b*, and 231*c* is used, a touch sensor may be provided in the button input tool 231 and 232.

The pressure button 232*a* and 232*b* may be moved up and down (a direction of the outside of an area) or a direction of the inside of an area in a sliding manner by the external force. In the latter case, a user may input a signal while pulling or pushing the pressure button 232*a* and 232*b*. In addition, when pushing the pressure button 232*a* and 232*b* and when pulling the pressure button 232*a* and 232*b*, a signal different from each other may be input.

In the drawing, five buttons 231 and 232 are illustrated. For example, each button 231 and 232 may include a home button 231*a* moving to a home menu, a back button 231*b* moving from a present screen to a previous screen, an option button 231*c* moving to an option menu and two shortcut buttons 232*a* and 232*b*. By designating a menu or a device, which is often used by a user, the shortcut buttons 232*a* and 232*b* may be configured to directly move to the menu or the device.

In the button input tool 231 and 232 according to a first embodiment, the touch button 231*a*, 231*b*, and 231*c* may be disposed on an upper side and on both lateral sides, and the pressure button 232a and 232b may be disposed between each touch button 231a, 231b, and 231c. Since the pressure button 232a and 232b are disposed between adjacent touch button 231a, 231b, and 231c, a mistake, operating the touch button 231a, 231b, and 231c differently from what a user intends, may be prevented.

The touch input device 200 according to a first embodiment may include a controller configured to recognize a gesture input to the touch unit 210 and 220, and configured to give a command to various devices by analyzing the gesture.

The controller may move a cursor or a menu on the display unit according to a position of a pointer moved on the touch unit 210 and 220. That is, when the pointer moves up and down, a cursor displayed on the display unit may be moved in the same direction or a pre-selected menu may be moved to a sub menu from a top menu.

The controller may analyze a trajectory, in which the pointer is moved, may correspond to a pre-determined gesture, and then may operate a command which is defined to the corresponding gesture. The gesture may be input in a way that the pointer performs flicking, rolling, spin, or tap. In addition, the user may input a gesture by using a variety of touch input methods.

Flicking may represent a touch input method performed in a way that a pointer is moved in one direction while being contacted to the touch unit 210 and 220, and then the contact state is released, rolling may represent a touch input method of drawing an arc with respect to the center of the touch unit 210 and 220, spin may represent a touch input method of drawing a circle with respect to the center of the touch unit 210 and 220, and tap may represent a touch input method of tapping the touch unit 210 and 220.

The controller may include a memory configured to store a program and data to control the touch input device 200 and the display device, and a processor configured to generate a control signal according to the stored program and data.

A user may input gesture by using a multi-pointer input technology. The multi-pointer input technology may represent a method of inputting a gesture in a state in which two pointers are contacted simultaneously or sequentially. For example, a gesture may be input while two fingers are contacted to the touch unit 210 and 220. By using the multi-pointer input technology, a single pointer input technology and inputting a gesture may be allowed, and thus a variety of commands or instructions, which are input by a user, may be provided.

The user may input a gesture by drawing a character, number, or symbol. For example, for Korean consonants and vowels, Alphabet, Arabic numeral, four arithmetic symbols may be drawn. The user may directly input a character or number intended to be input, so that an input time may be reduced and an intuitive interface may be provided.

The touch unit 210 and 220 may be provided to allow a pressing gesture or tilting gesture. Accordingly, a user may press or tilt a part of the touch unit 210 and 220 by pressing the touch unit 210 and 220 so that a user may input an operation signal corresponding to the pressing or the tilting. The pressing gesture may include a case in which the touch unit 210 and 220 is pressed in a flat manner and a case in which the touch unit 210 and 220 is pressed in a tilted manner. In addition, when the touch unit 210 and 220 is provided to be flexible, a part of the touch unit 210 and 220 may be pressed.

For example, the touch unit 210 and 220 may be tilted in at least one direction (d1 to d4) with respect to a central axis of the touch unit 210 and 220. As illustrated in FIG. 2, the touch unit 210 and 220 may be tilted in four directions of up, down, left and right (d1 to d4), but is not limited thereto. The touch unit 210 and 220 may be provided to be tilted in various directions according to embodiments. In addition, when pressing a central portion d5 of the touch unit 210 and 220, the touch unit 210 and 220 may be pressed in a flat manner.

A user may input a certain instruction or command by pressing or tilting the touch input device 200 with pressure. For example, the user may select a menu by pressing the central portion d5 of the touch unit 210 and 220, and may move a cursor upward by pressing an upper side d1 of the touch unit 210 and 220.

Figure 4:
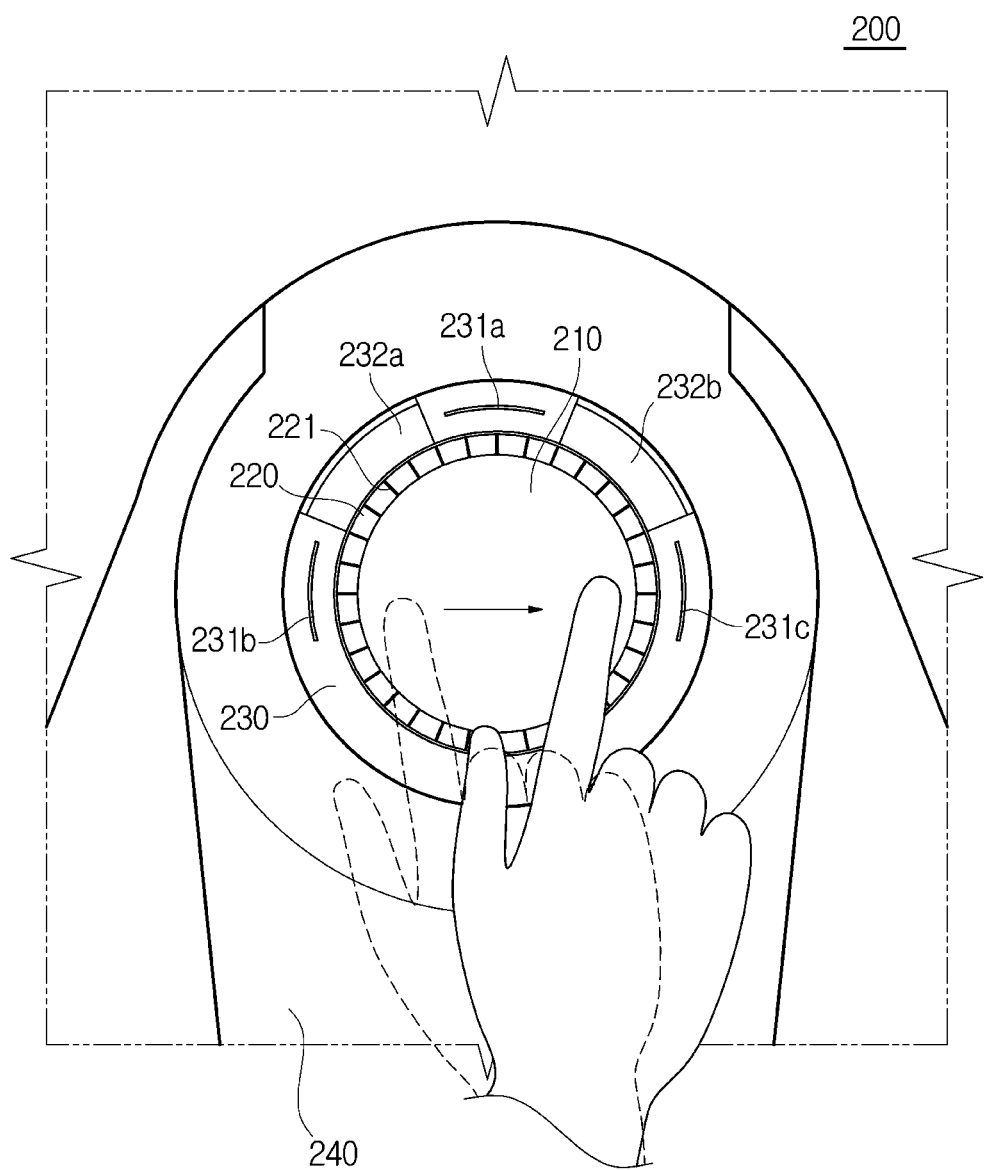
FIGS. 4 to 6 are views showing an operation of a touch input device in accordance with a first embodiment in the present disclosure, particularly
Figure 5:
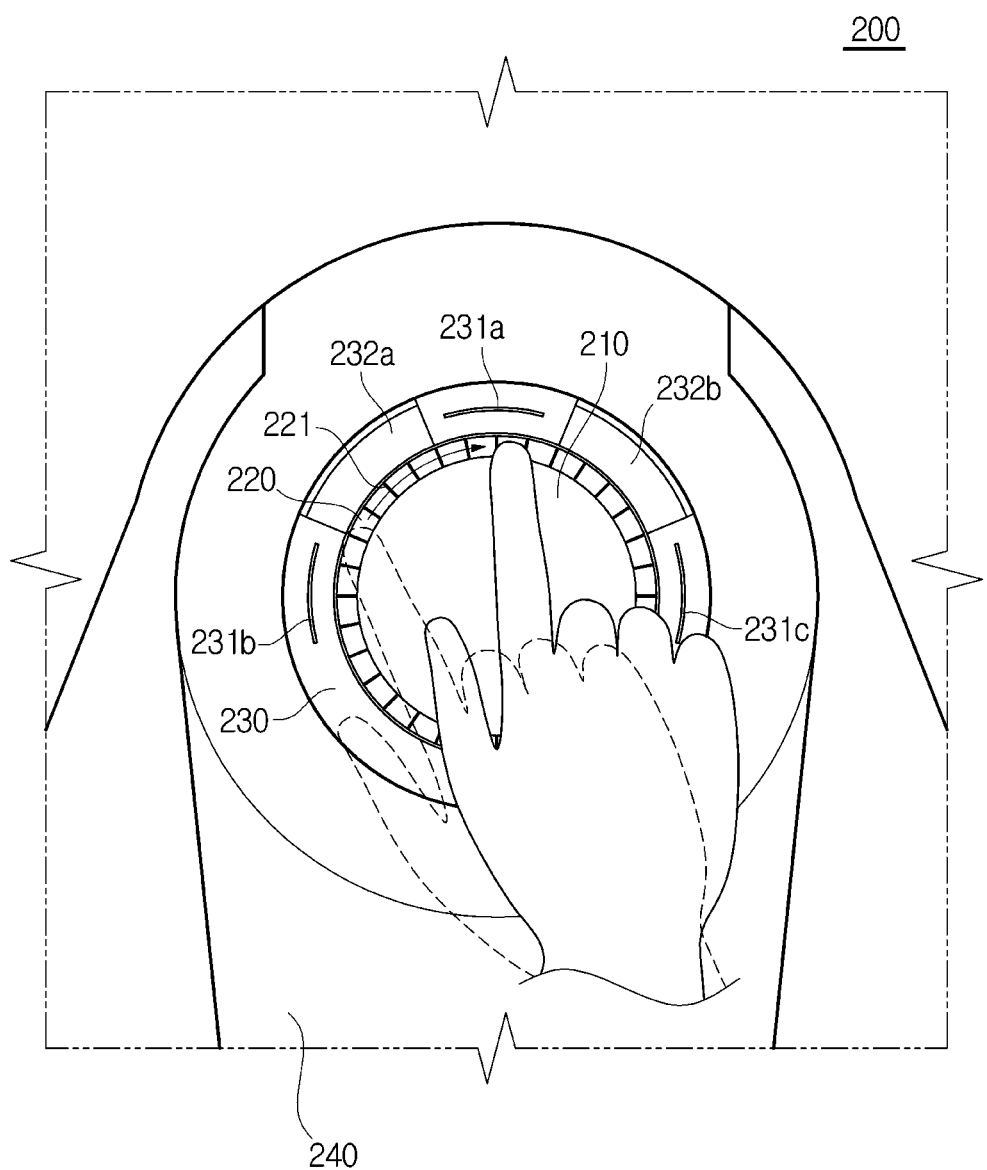
Figure 6:
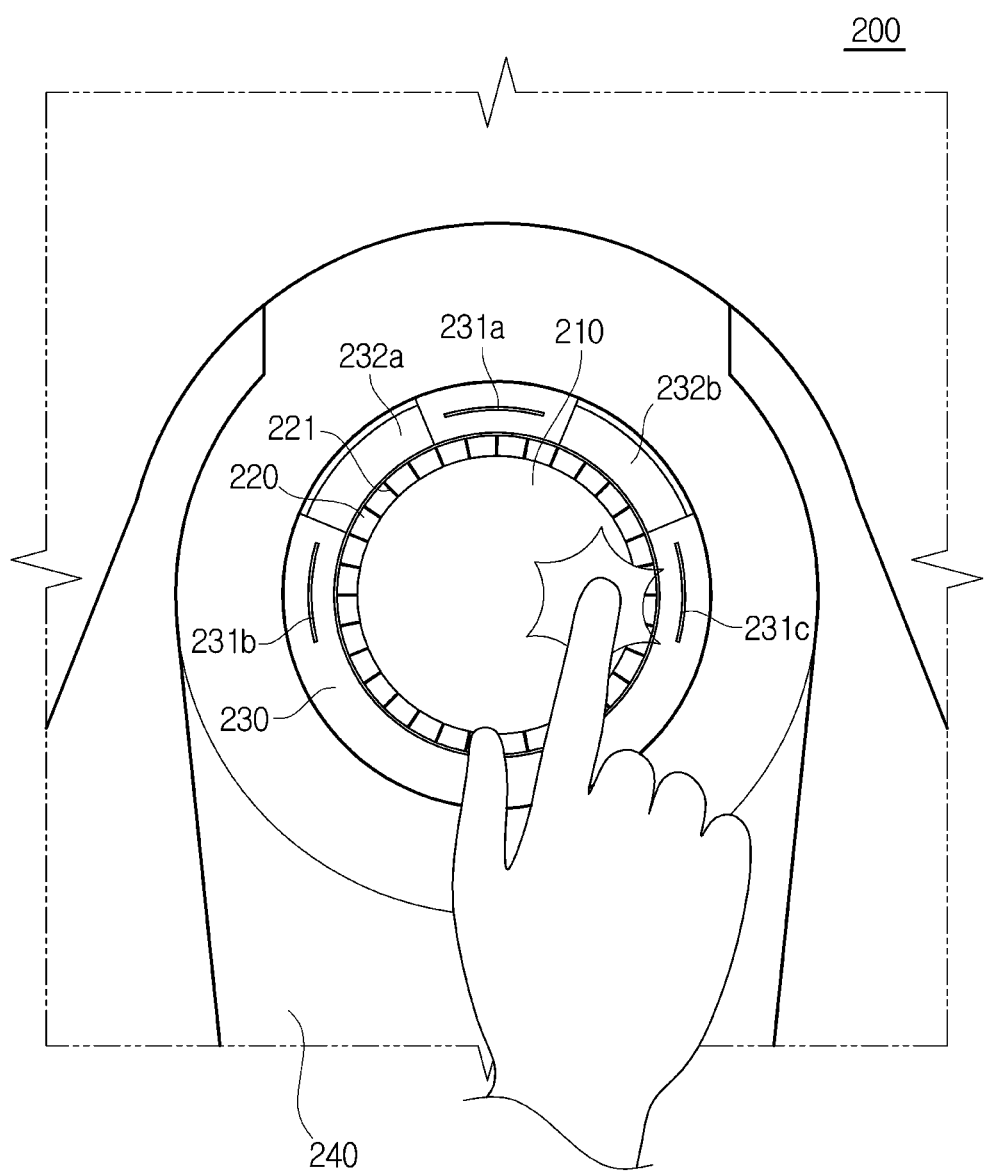

FIGS. 4 to 6 are views illustrating an operation of a touch input device in accordance with a first embodiment in the present disclosure, particularly FIG. 4 is a view of inputting a gesture, FIG. 5 is a view of inputting swiping, and FIG. 6 is a view of inputting tap.

Referring to FIG. 4, a user may input a gesture command by drawing a gesture on the gesture input unit 210. FIG. 4 illustrates a flicking gesture performed in such a way that a pointer is moved from the left side to the right side. Referring to FIG. 5, a user may input a rolling or a spin gesture by swiping, that is rolling or spinning, the swiping input unit 220. FIG. 5 illustrates a swiping gesture performed in such a way that a pointer starts a contact in the left inclined portion 220 and then moves to the upper side along the inclined portion 220.

Referring to FIG. 6, a user may input a gesture command by pressing the gesture input unit 210. FIG. 6 illustrates a gesture of tapping the right side of the gesture input unit 210.

The gesture input unit 210 and the curved surface portion 210 of the touch unit may refer to the same object, and the swiping input unit 220 and the inclined portion of the touch unit may refer to the same object.

Although not shown in the drawings, the inside of the touch input device 200 may include a variety of components related to operations. A structure configured to allow the touch unit 210 and 220 to be pressed or tilted in five directions (d1 to d5) may be included in the touch input device 200.

In addition, a variety of semiconductor chips and Printed Circuit Board (PCB) may be installed in the touch input device 200. The semiconductor chip may be installed in the PCB. The semiconductor chip may perform information processing or storing of data. The semiconductor chip may analyze a certain electrical signal, which is generated by an external force applied to the touch input device 200, a gesture recognized in the touch unit 210 and 220, and an operation of the button 231 and 232 provided in the touch input device 200, may generate a certain control signal according to the analyzed content, and may transmit the control signal to the controller or the display device.

Figure 7:
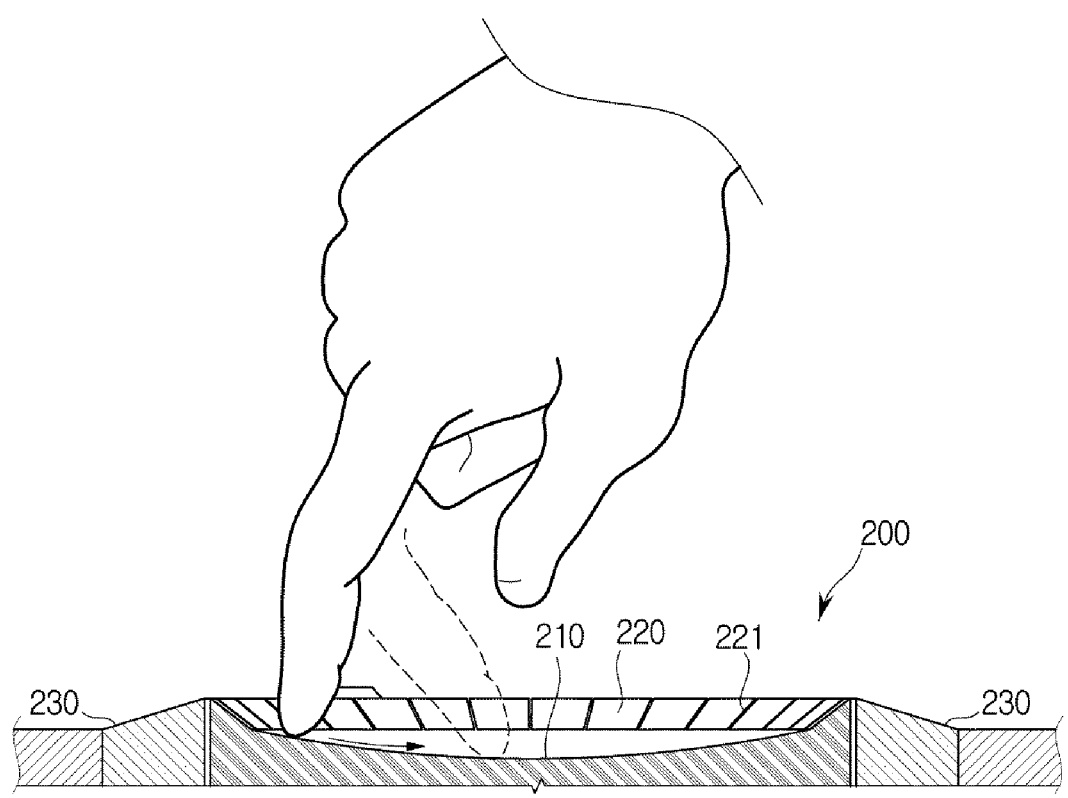
FIG. 7 is a view showing a finger's trajectory when a user inputs a gesture vertically.
Figure 8:
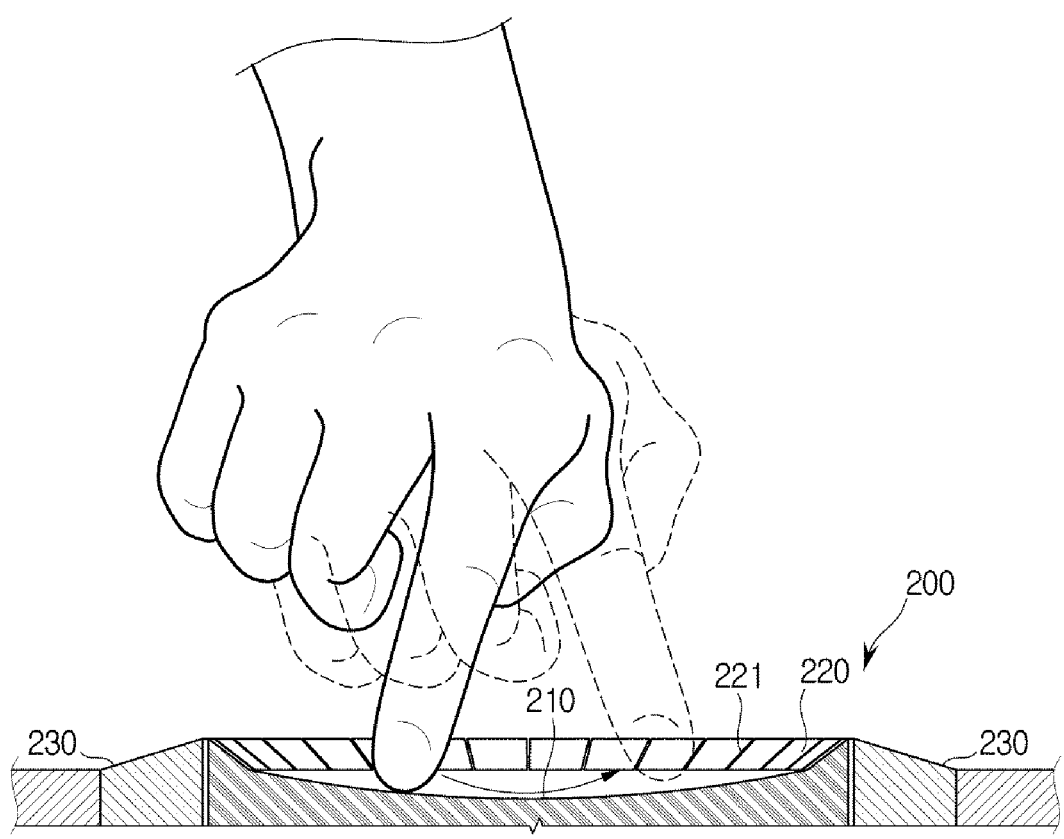
FIG. 8 is a view showing a finger's trajectory when a user inputs a gesture horizontally.

FIG. 7 is a view illustrating a finger's trajectory when a user inputs a gesture vertically and FIG. 8 is a view illustrating a finger's trajectory when a user inputs a gesture horizontally.

The touch unit 210 and 220 according to a first embodiment may include a concave surface. The curvature of the touch unit 210 and 220 may be determined to allow a user to easily input a gesture. Referring to FIG. 7, a user may input a gesture with a natural movement of the finger without moving or bending the joint other than the finger when the user moves the finger up and down.

Referring to FIG. 8, a user may input a gesture with a natural movement of the finger and the wrist without excessively twisting the wrist when the user moves the finger in the left side and the right side. A shape of the touch unit 210 and 220 according to embodiments may be provided in an ergonomic manner so that a user will feel less fatigue with the use of a long period of time, and muscloskeletal disease, which may occur in the wrist or other joint of the user, may be prevented.

Hereinafter a method of inputting a character by operating the touch input device 200 according to a first embodiment will be described with reference to FIGS. 9A to 12B.

FIGS. 9A to 10B are views illustrating an example of an inputting a character by operating a touch input device in accordance with a first embodiment of the present disclosure, and a result of inputting, and FIGS. 11A to 13B are views illustrating deleting or substituting inputted character or a result of deleting or substituting.

Referring to FIGS. 9A to 10B, a user may select a character intended to be input, by operating the touch input device 200.

Figure 9A:
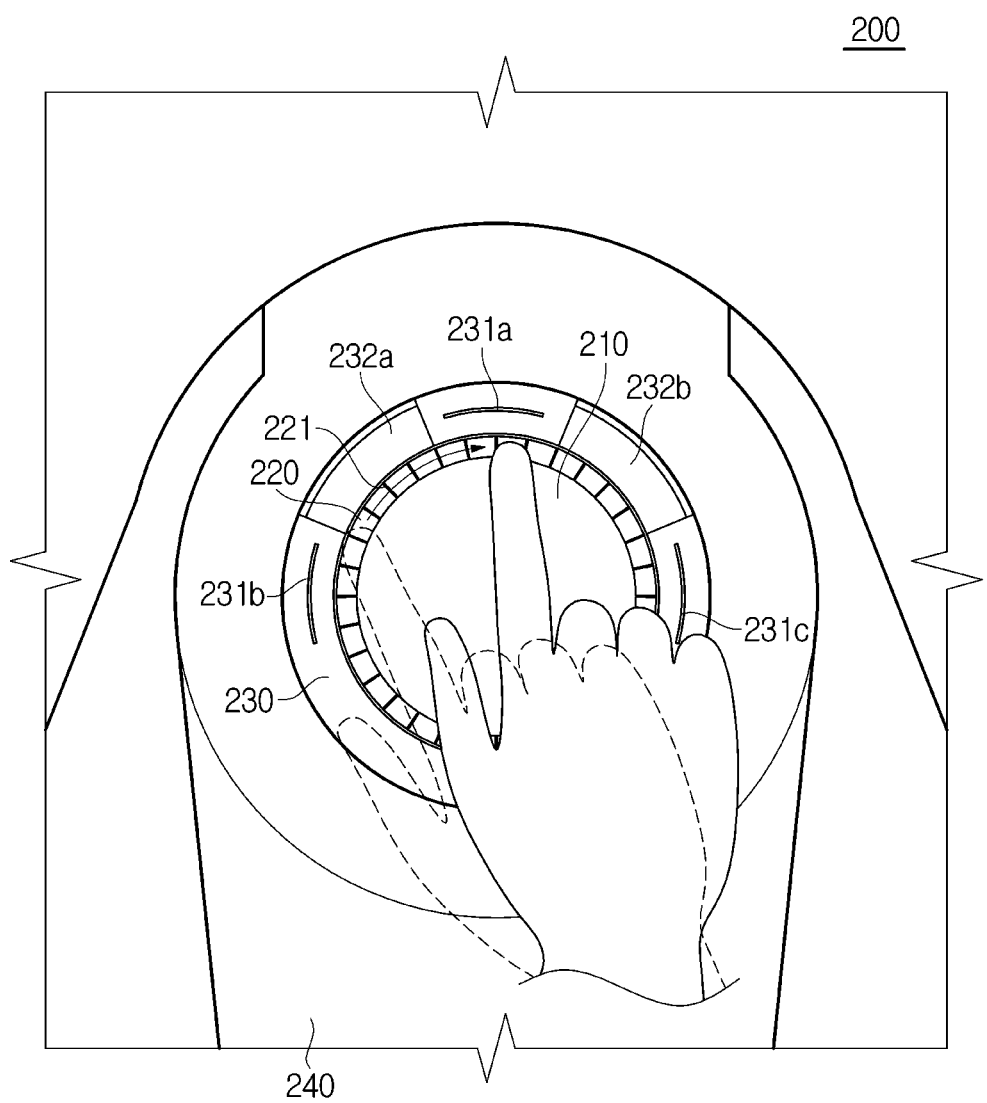
FIGS. 9A to 10B are views showing an example of inputting a character by operating a touch input device in accordance with a first embodiment in the present disclosure, and a result of inputting.
Figure 9B:
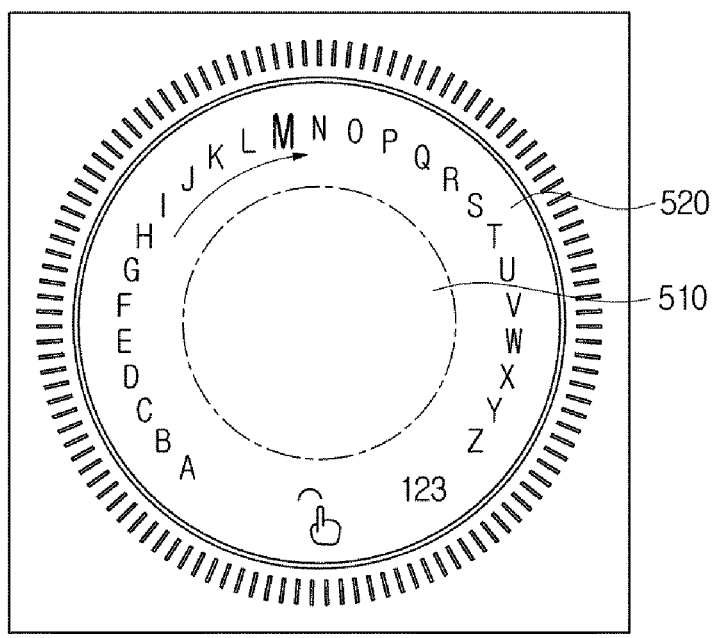

Particularly, referring to FIG. 9A, the user may search a character capable of being input by performing a rolling gesture or a spin gesture (swiping) in the swiping input unit 220 of the touch unit. Referring to FIG. 9B, a display device 500 may display characters capable of being input by a user on a swiping display area 520. The controller may allow a cursor moved on the swiping display area 520 of the display device 500 to be corresponded to a position of a pointer and thus a character (M) placed in a position of the cursor may be selected and to be highlighted for the user.

According a first embodiment, when the swiping input unit 220 includes the scale 221 (refer to FIG. 9A), a cursor displayed on the display device 500 may be moved according to the number of the scale 221 passed by the finger during a swiping gesture. When a variety of characters are sequentially arranged on the swiping display area 520 of the display device 500, a selected character may be moved by a space to the each next time a user passes a single scale 221 during a swiping gesture (rolling or spin).

FIG. 9B illustrates that a position of a cursor displayed on the swiping display area 520 is the same as a position of a pointer input to the swiping input unit 220, but a position of a cursor displayed on the display device 500 and a position of a cursor practically inputted to the touch input device 200 may be different from each other. For example, although a user starts a contact of the pointer from the left side inclined portion 220 of the touch input device 200 and move the pointer upward along the inclined portion 220 clockwise, on the display device 500, "V" displayed on the right side may be selected and then "W", "X", "Y" and "Z may be selected in order clockwise according to an operation of movement of the user.

Figure 10A:
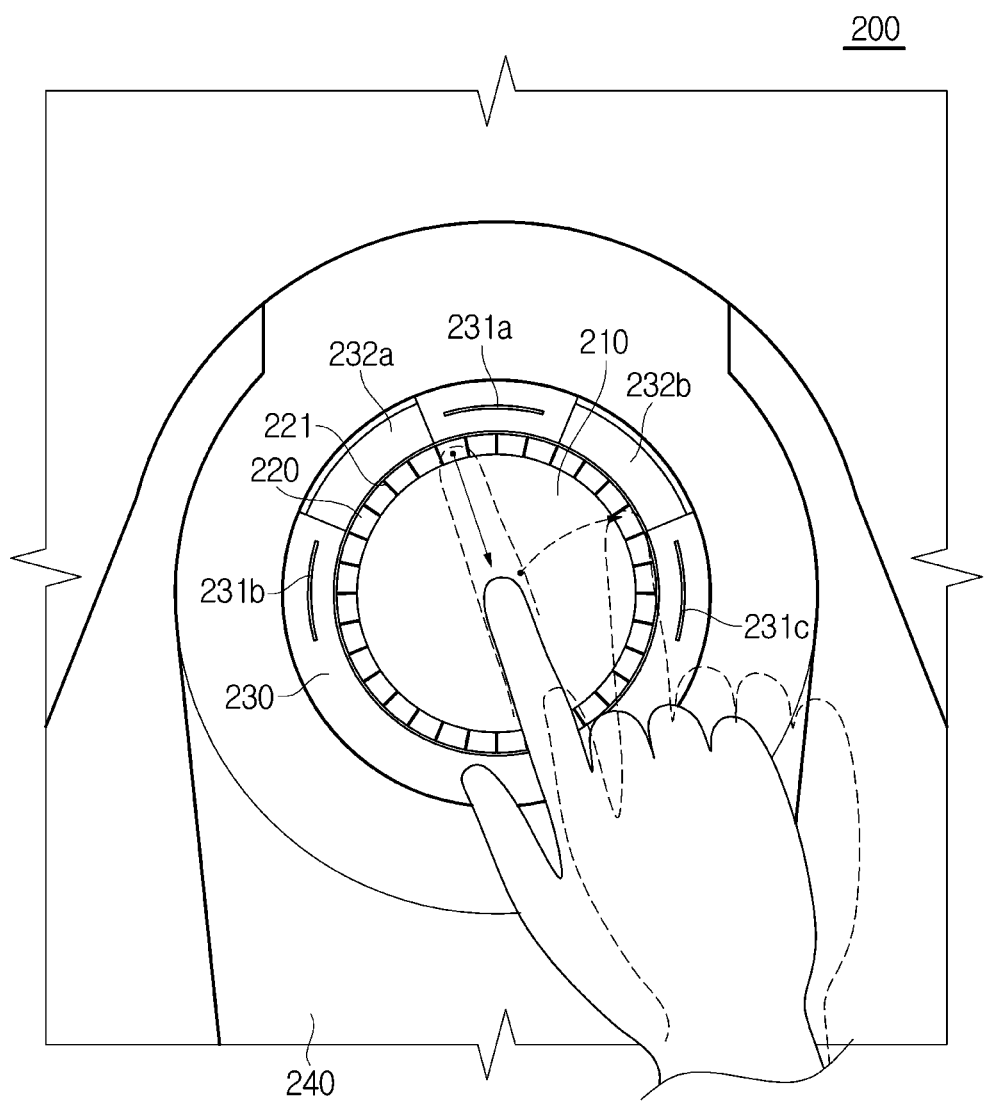

Referring to FIG. 10A, by starting a contact of the pointer in the swiping input unit 220 and moving the pointer to the gesture input unit 210 while the pointer is kept in touch, and then detaching the pointer, that is flicking, a user may input a character, in which a cursor is placed, that is the selected character. Further, when the user starts a contact of the pointer in the swiping input unit 220 and moves the pointer to the gesture input unit 210 while the pointer is kept in touch, and then moves the pointer to the swiping input unit 220 still while the pointer is kept in touch, the selected character may be not input.

Although not shown, the user may input the selected character by pressing the central portion of the gesture input unit 210.

In addition, by starting a contact of the pointer in the gesture input unit 210 and moving the pointer to the swiping input unit 220 while the pointer is kept in touch, that is flicking, a user may delete a character which is just before input.

The input character may be stored in the memory of the controller after being converted into an input signal.

Figure 10B:
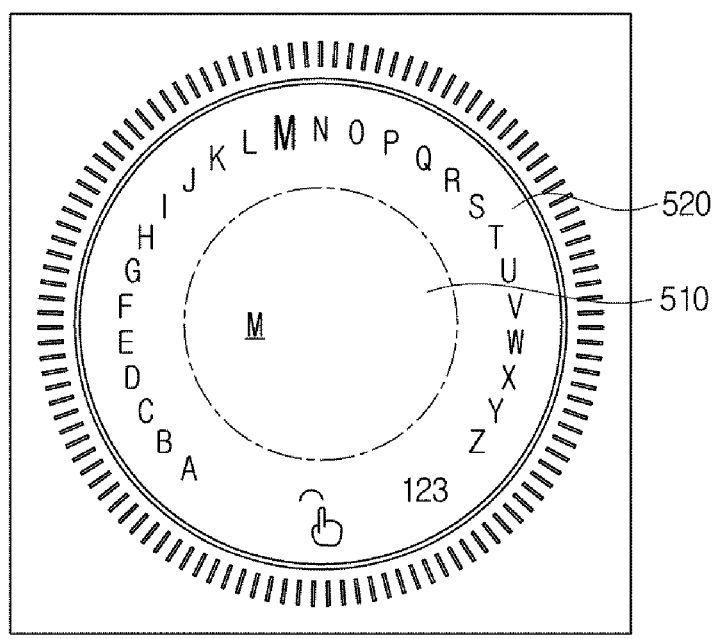

Referring to FIG. 10B, the display device 500 may arrange one or more characters input by a user on a main display area 510 and a cursor on the main display area 510 may be placed on a position where the last character is input.

Meanwhile, an area where a cursor displayed on the display device 500 is placed may vary according to whether an end point of the input pointer is the gesture input unit 210 or the swiping input unit 220.

For example, when a user performs a swiping gesture from the swiping input unit 220 to the gesture input unit 210, the end of the pointer may be placed in the gesture input unit 210, and thus a cursor may be placed in the main display area 510 of the display device 500.

In contrast, when a user performs a swiping gesture from the gesture input unit 210 to the swiping input unit 220, the end of the pointer may be placed the swiping input unit 220 and thus a cursor may be placed in the swiping display area 520 of the display device 500.

When a user taps the gesture input unit 210, the end point of the pointer may be placed in the gesture input unit 210, and thus a cursor may be placed in the main display area 510 of the display device 500.

In contrast, when a user taps the swiping input unit 220, the end point of the pointer may be placed in the swiping input unit 220, and thus a cursor may be placed in the swiping display area 520 of the display device 500.

Regardless of the end point of the pointer, when a user performs a flicking gesture, a rolling gesture, a spin gesture, or a tap gesture in the gesture input unit 210, a cursor may be moved in the main display area 510.

In addition, when a user performs a flicking gesture, a rolling gesture, a spin gesture, or a tap gesture in the swiping input unit 220, a cursor may be moved in the swiping display area 520.

The user may delete or replace previously input character input by placing a cursor in the main display area 510.

Figure 11A:
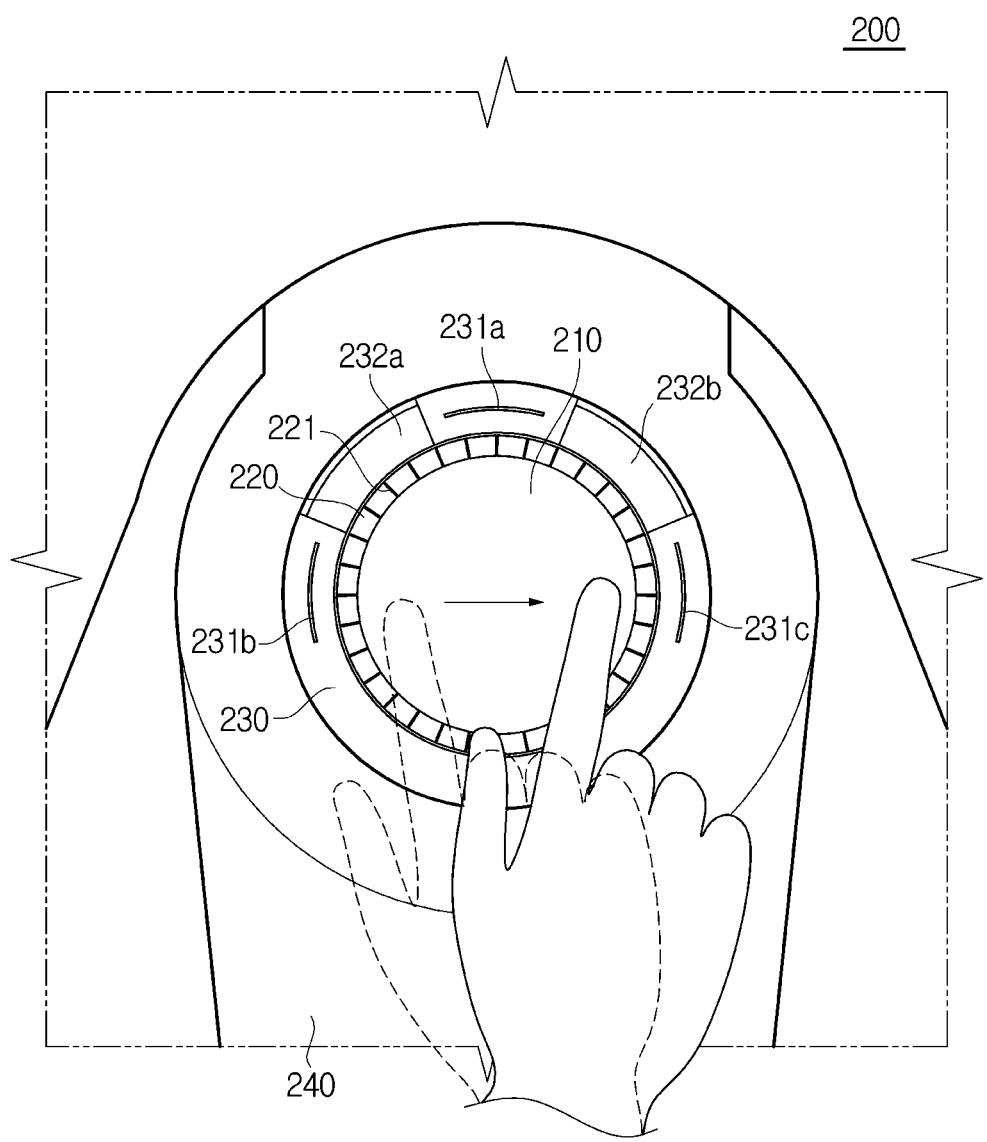
FIGS. 11A to 13B are views showing deleting or replacing an inputted character or a result of deleting or replacing.
Figure 11B:
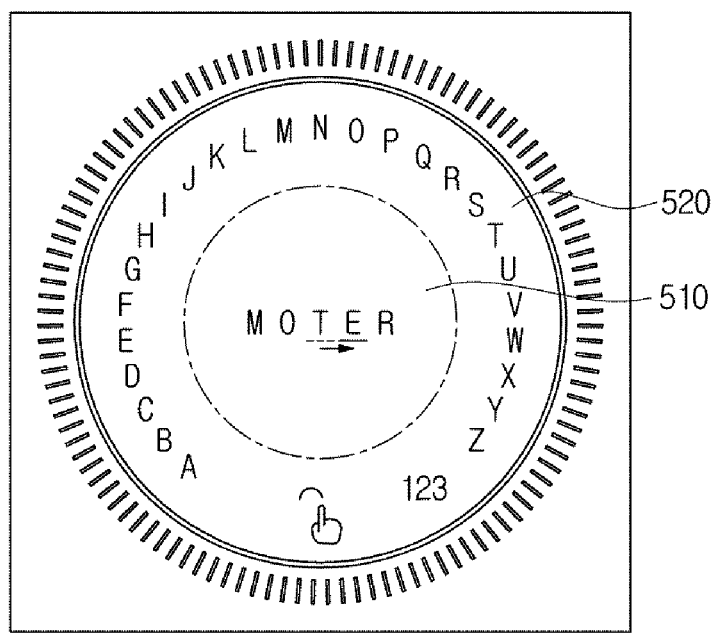

For example, referring to FIGS. 11A and 11B, by performing a flicking gesture by starting a contact to the left side of the gesture input unit 210 to the right side of the gesture input unit 210, a user may move a cursor of the main display area 510 to the right side in the main display area 510. In contrast by performing a flicking gesture to the left side of the gesture input unit 210 by starting a contact to the right side of the gesture input unit 210, a user may move a cursor of the main display area 510 to the left side in the main display area 510.

For example, when a user intends to replace "moter" which is previously input, with "motor", a user may select "e" by performing a flicking in the gesture input unit 210 to delete "e" and to replace with "o".

Figure 12A:
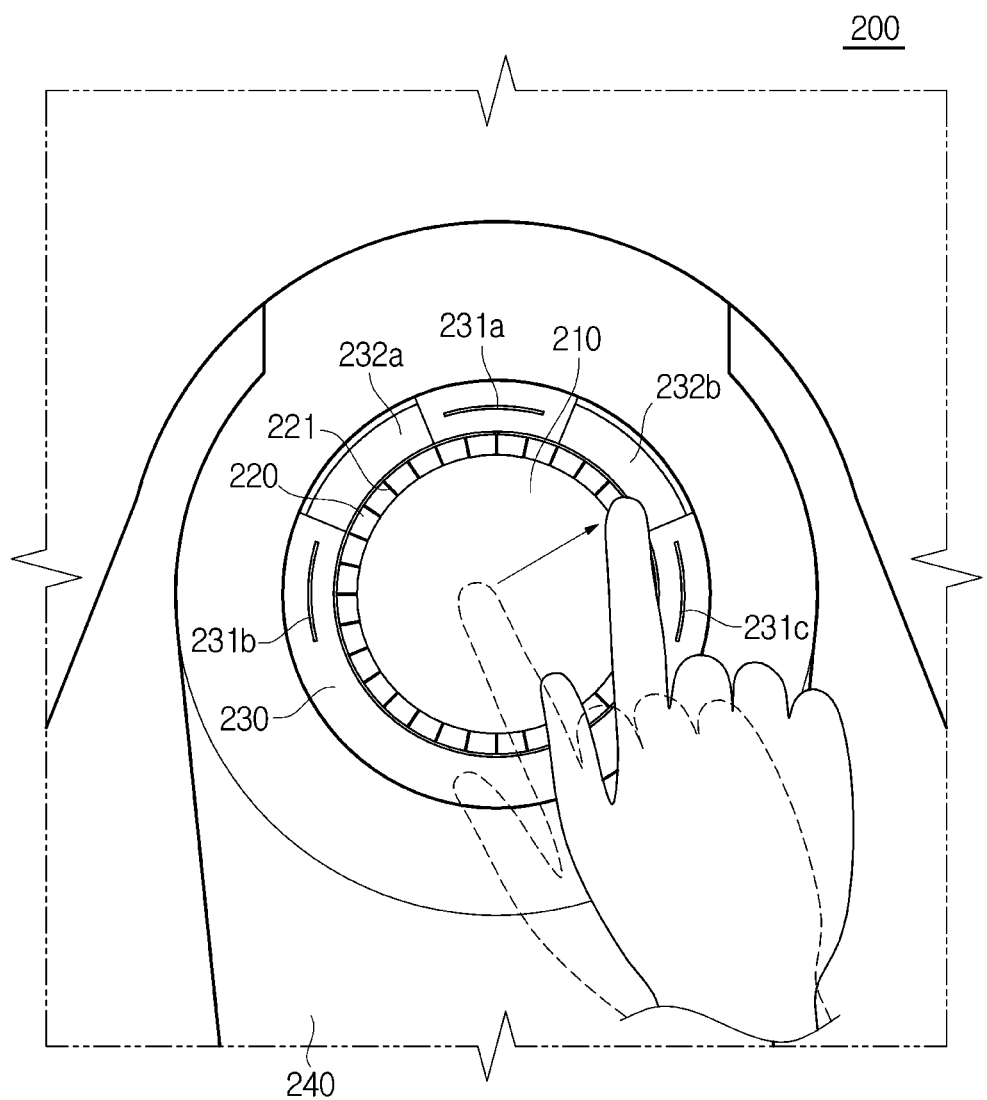
Figure 12B:
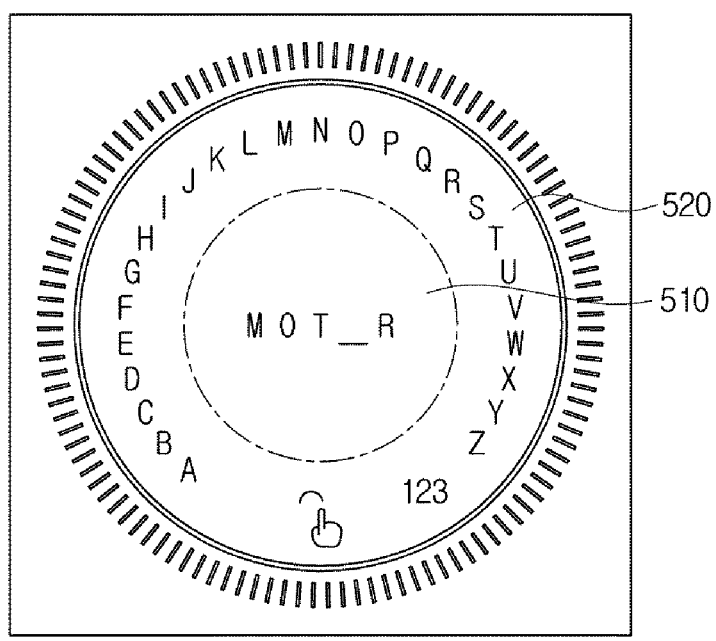

Referring FIGS. 12A and 12B, a user may delete the selected character by performing a flicking gesture by starting a contact to the gesture input unit 210. That is, the user moves the pointer to the swiping input unit 220 in a state of placing in the gesture input unit 210 while the pointer is kept in touch so that the user may delete the selected character "e".

In addition, the user may delete the selected character by pressing the back button 231*b* provided in the touch input device 200.

Figure 13A:
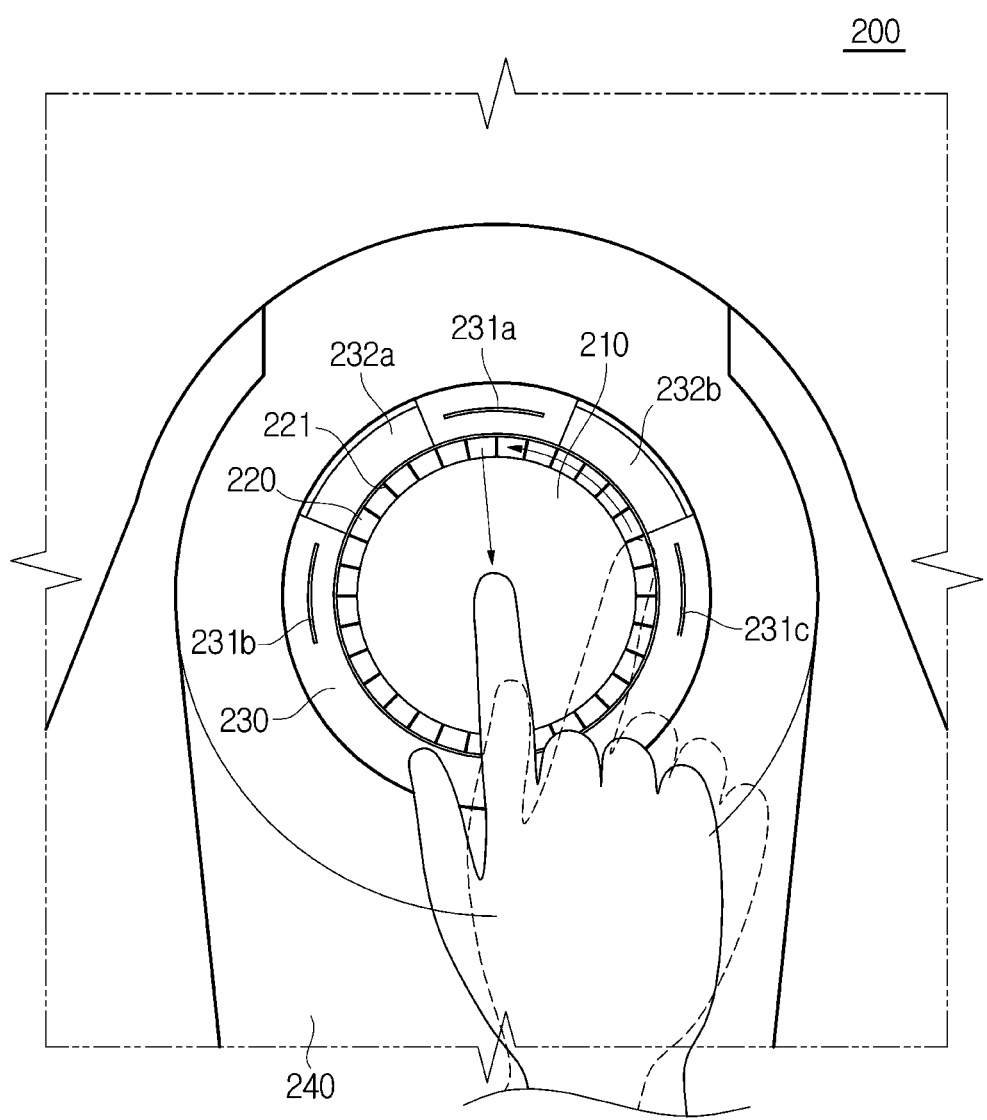
Figure 13B:
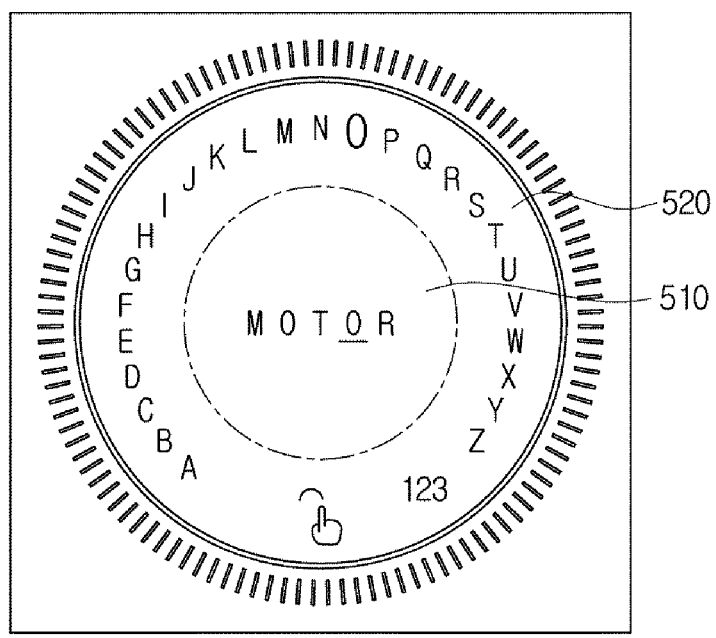

Referring to FIGS. 13A and 13B, a user may perform a swiping gesture (rolling or spin) by drawing an arc in the swiping input unit 220, and by starting a contact of the pointer to the swiping input unit 220 and moving the pointer to the gesture input unit 210, a user may input a new character.

That is, a user may select a character, which is to be input instead of deleted alphabet "e" by swiping the swiping input unit 220. In a state in which "o" is selected, when moving the pointer from the swiping input unit 220 to the gesture input unit 210 while the pointer is kept in touch, and then taking off the pointer, that is flicking, the user may replace the delete "e" with a selected "o".

Further, when the user starts a contact of the pointer from the swiping input unit 220 to move the pointer to the gesture input unit 210 while the pointer is kept in touch, and then moves the pointer to the swiping input unit 220 still while the pointer kept in touch, a selected character may be not input.

Figure 14:
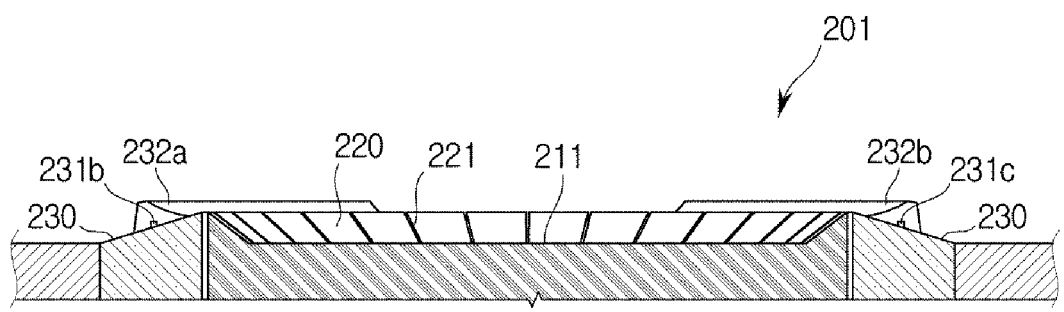
FIG. 14 is a cross-sectional view of a touch unit in accordance with a second embodiment in the present disclosure.

FIG. 14 is a cross-sectional view of a touch unit in accordance with a second embodiment of the present disclosure.

Referring to FIG. 14, a touch unit 211 and 220 according to a second embodiment may include a gesture input unit 211 provided in a flat surface, and a swiping input unit 220 provided to be inclined downwardly. The gesture input unit 211 may be placed to be lower than the outside of the touch unit 211 and 220, and the boundary of the touch unit 211 and 220 so that a user may intuitively recognize the touch area.

By providing an inclined portion 220, a user may easily input a swiping gesture.

Figure 15:
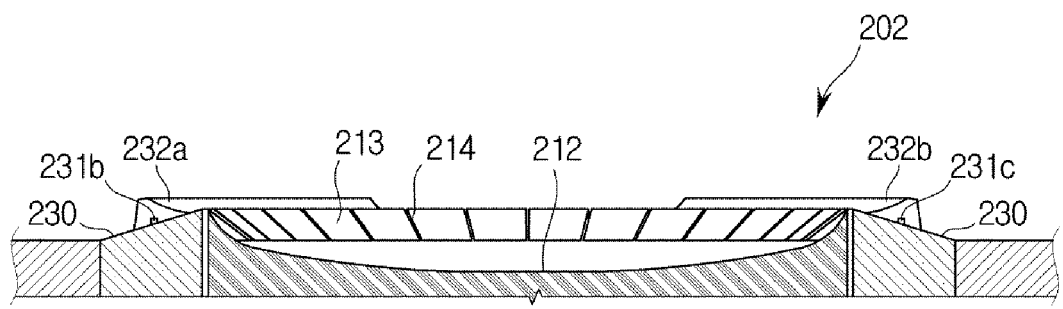
FIG. 15 is a cross-sectional view of a touch unit in accordance with a third embodiment in the present disclosure.

FIG. 15 is a cross-sectional view of a touch unit in accordance with a third embodiment in the present disclosure.

Referring to FIG. 15, a touch unit 212 and 220 according to a third embodiment may be formed in such a way that a gesture input unit 212 and a swiping input unit 220 are formed to be a sequentially curved surface. A curvature of the swiping input unit 220 may be larger than a curvature of the gesture input unit 212. A user may distinguish the swiping input unit 220 from the gesture input unit 212 without looking at the touch unit 212 and 220, by detecting the dramatic change in curvature.

Figure 16:
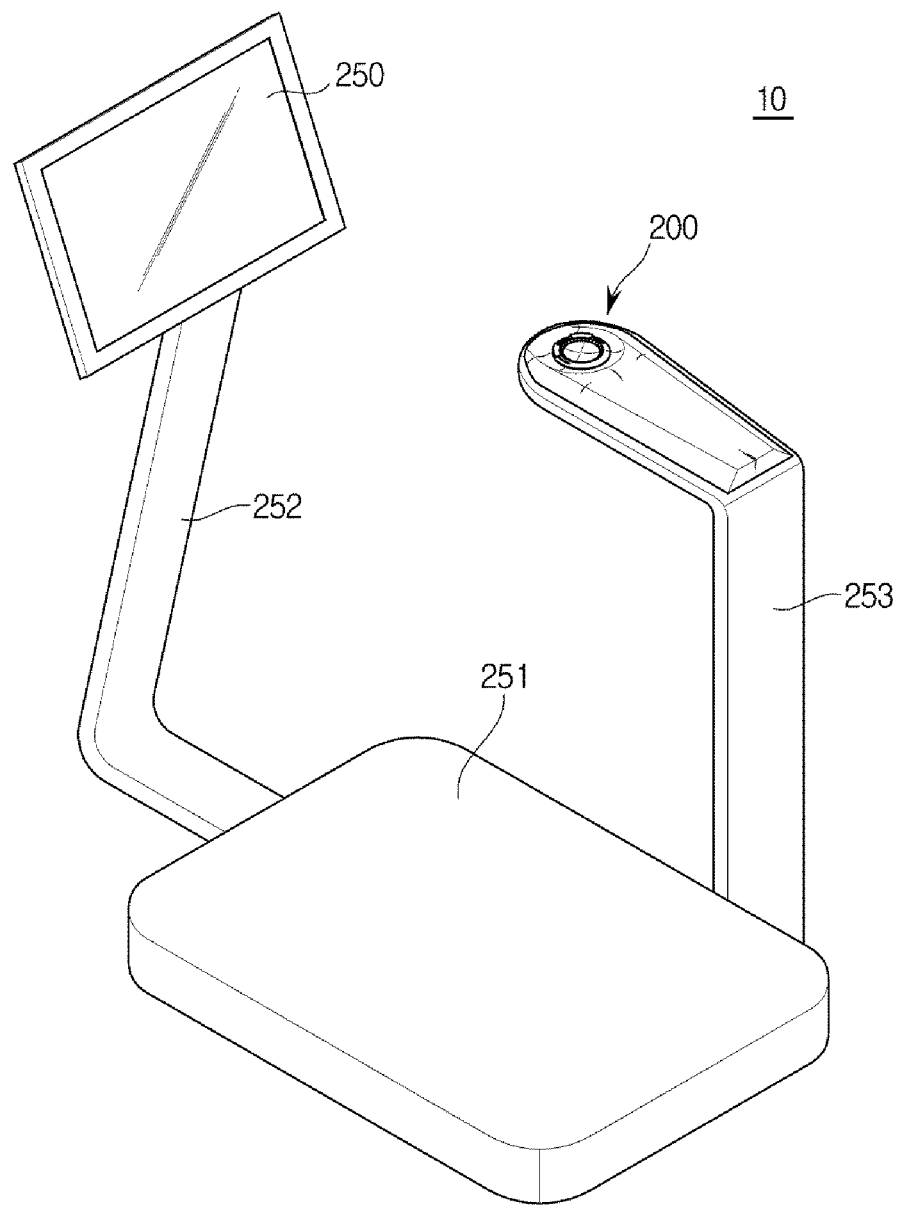
FIG. 16 is a perspective view showing a touch input device, which is in accordance with the first to third embodiments, installed in health care equipment.

FIG. 16 is a perspective view illustrating a touch input device, which is in accordance with the first to third embodiments, installed in health care equipment.

The touch input device 200 according to first to third embodiment may be installed in health care equipment 10. The health care equipment may include a medical apparatus. The health care equipment 10 may include a body 251 on which a user stands, a display unit 250, a first connection unit 252 configured to connect the body 251 to the display unit 250, a touch input device 200, and a second connection unit 253 configured to connect the touch input device 200 to the body 251.

The body 251 may measure a variety of user's physical information including weight.

The display unit 250 may display a variety of image information including measured physical information. In addition, the user may operate the touch input device 200 while looking at the display unit 250.

The display unit 250 may be the above-mentioned display device 500 related to FIGS. 9A to 13B.

The touch input device 200 according to first to third embodiment may be installed in a vehicle 20.

The vehicle 20 may represent a variety of apparatuses configured to transport an object, such as people, goods or animals, from the departure point to the destination. The vehicle 20 may include a car driving on a road or a track, a ship moving on seas or rivers, and an air plane flying in the sky by using the action of air.

The vehicle driving on the road or the track may be moved in a certain direction according to the rotation of at least one wheel, and may include a three-wheeled or four-wheeled automobiles, construction equipment, motorcycle, for driving the motor bicycle or a bicycle device and the line may include a train.

Further, a vehicle driving on the road or track may be moved in a predetermined direction according to the rotation of the at least one wheel, and the vehicle may include a three-wheeled or four-wheeled vehicle, a piece of construction equipment, a two-wheeled vehicle, a motorcycle or a cycle, and a train traveling on a track.

Figure 17:
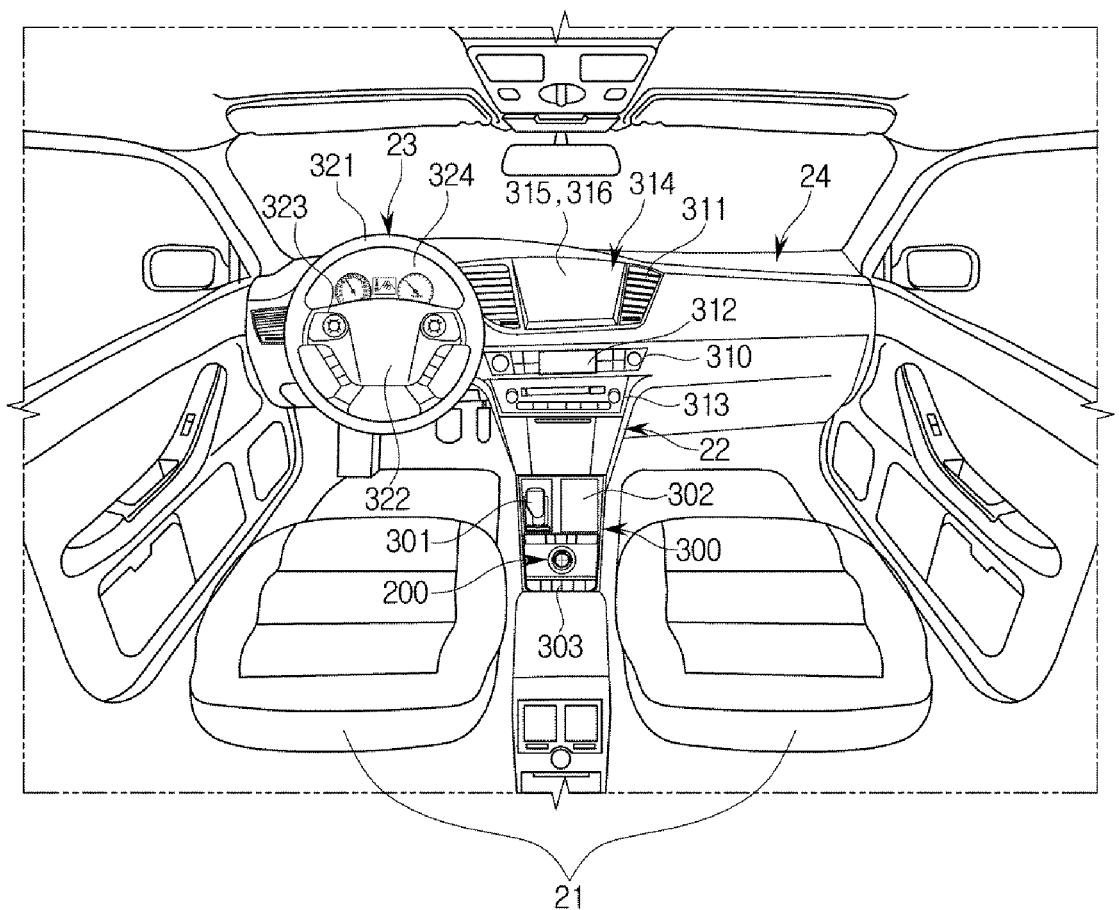
FIG. 17 is a view showing an interior of a vehicle, in which a touch input device in accordance with a first embodiment is installed.
Figure 18:
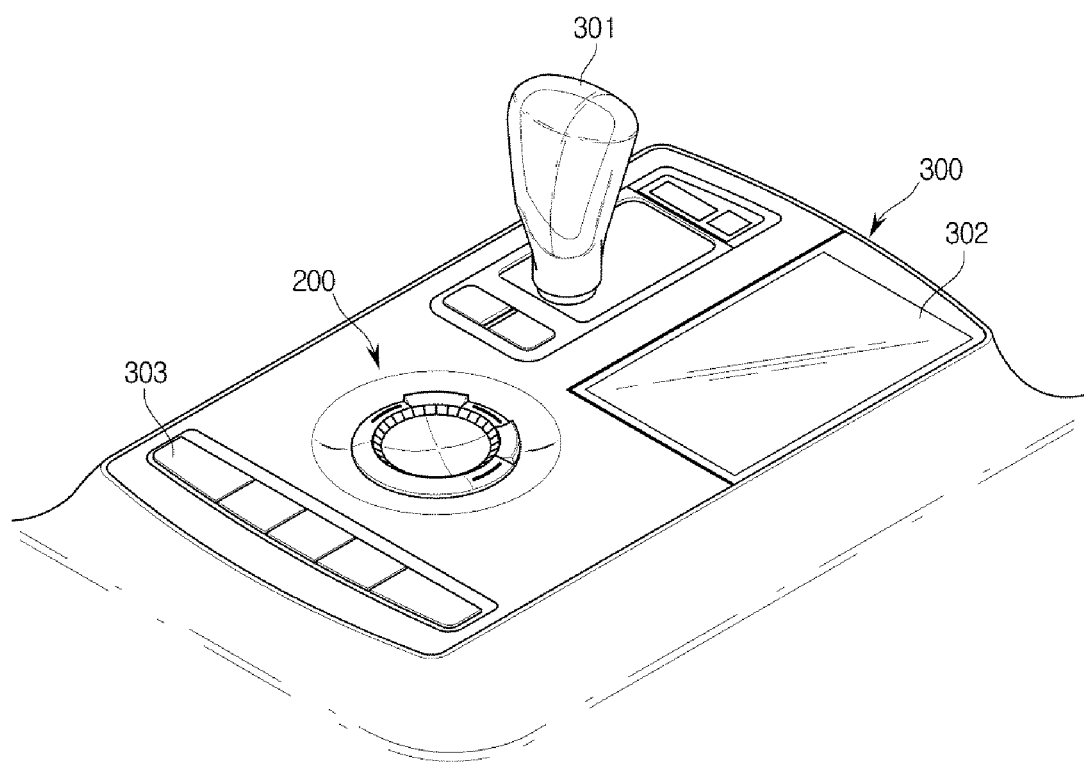
FIG. 18 is a perspective view showing a gearbox in which a touch input device in accordance with a first embodiment is installed.

FIG. 17 is a view showing the interior of a vehicle, in which a touch input device in accordance with a first embodiment is installed; and FIG. 18 is a perspective view showing a gearbox in which a touch input device in accordance with a first embodiment is installed.

Referring to FIG. 17, the vehicle 20 may include a seat 21 on which a passenger is seated, a gear box 300, a dashboard 24 provided with a center fascia 22 and a steering wheel 23.

An air conditioning device 310, a clock 312, an audio device 313 and an AVN device 314 may be installed in the center fascia 22.

The air conditioning device 310 may keep air inside the vehicle 20 fresh by controlling temperature, moisture, air cleanliness, and flow of air within the inside of the vehicle 20. The air conditioning device 310 may be installed in the center fascia 22 and may include at least one discharging port 311 discharging air. A button or a dial may be installed in the center fascia 22 to control the air conditioning device 310. A user, such as a driver, may control the air conditioning device 310 by using a button disposed on the center fascia 22.

The clock 312 may be provided adjacent to a button or a dial which are configured to control the air conditioning device 310.

The audio device 313 may include an operation panel in which a number of buttons are provided to perform functions of the audio device 313. The audio device 313 may provide a radio mode configure to provide a radio function, and a media mode configured to play an audio file of various storage media in which the audio file is stored.

The AVN device 314 may be embedded inside the center fascia 22 of the vehicle 20 or may be protruded on the dashboard 24. The AVN device 314 may be a device configured to integrally operate an audio function, a video function, and a navigation function according to an operation by a user. The AVN device 314 may include an input unit 315 configured to receive an input of a command about the AVN device 314 from a user, and a display unit 316 configured to display a screen related to an audio function, a screen related to a video function, and a screen related to a navigation function. However, the audio device 313 may be omitted when the AVN device 314 is overlapped therewith.

The steering wheel 23 may be a device configured to adjust a driving direction of the vehicle 20, and may include a rim 321 held by the driver and a spoke 322 connected to a steering system of the vehicle 20 and configured to connect the rim 321 to a hub of a rotation shaft for the steering. According to embodiments, a manipulation device 323 may be formed in the spoke 322 to control various devices, such as an audio device, inside the vehicle 20.

The dashboard 24 may further include various gauge boards 324 informing on a variety of information, e.g., driving speed, mileage, engine speed, lubrication quantity, cooling water temperature and a variety of warnings, to a driver during driving the vehicle, and a globe box 325 in which various things are stored.

In general, the gear box 300 may be installed between a driver seat and a passenger seat in the vehicle 20, and operation devices needed to be operated while a driver drives the vehicle 20 may be mounted to the gear box 300.

Referring to FIG. 18, in the gear box 300, a gear lever 301 configured to change a speed of the vehicle 20, a display unit 302 configured to control performing functions of the vehicle 20, and a button 303 configured to operate a variety of devices of the vehicle 20 may be installed. The touch input device 200 according to a first embodiment may be installed in the gear box 300.

The touch input device 200 according to embodiments may be installed in the gear box 300 to allow a driver to operate the touch input device 200 while a driver looks forward during driving. For example the touch input unit 200 may be installed on a lower portion of the gear lever 301. Alternatively, the touch input device 200 may be installed in the center fascia 22, a passenger seat, or a rear seat.

The touch input device 200 may be connected to the display devices inside the vehicle 20 to select or operate a variety icons displayed on the display devices.

The display device installed in the vehicle 20 may be the audio device 313, the AVN device 314 or the gauge boards 324. As needed, the display unit 302 may be installed in the gear box 300. In addition, the display device may be connected to a Head Up Display (HUD) device or a back mirror.

For example, the touch input device 200 may move a cursor displayed on the display device or operate an icon. The icon may include a main menu, a selection menu, and a setting menu. In addition, through the touch input device 200, a navigation may be operated, operation condition of the vehicle may be set, and peripheral devices of the vehicle may be operated.

The display device may be the above-mentioned display device 500 related to FIGS. 9A to 13B.

Hereinafter a method of inputting character of the touch input device 200 will be described in accordance with a first embodiment with reference to FIGS. 19 and 20.

Figure 19:
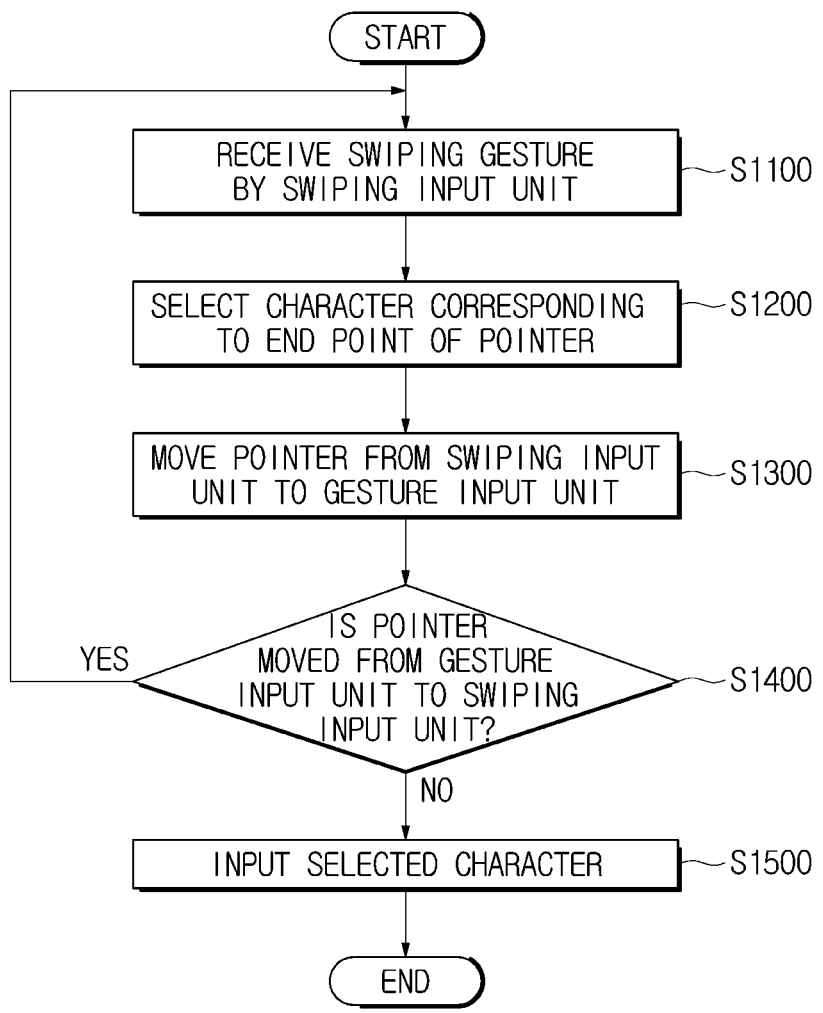
FIG. 19 is a control flow chart of a touch input device to input a character by using a touch input device in accordance with a first embodiment in the present disclosure.
Figure 20:
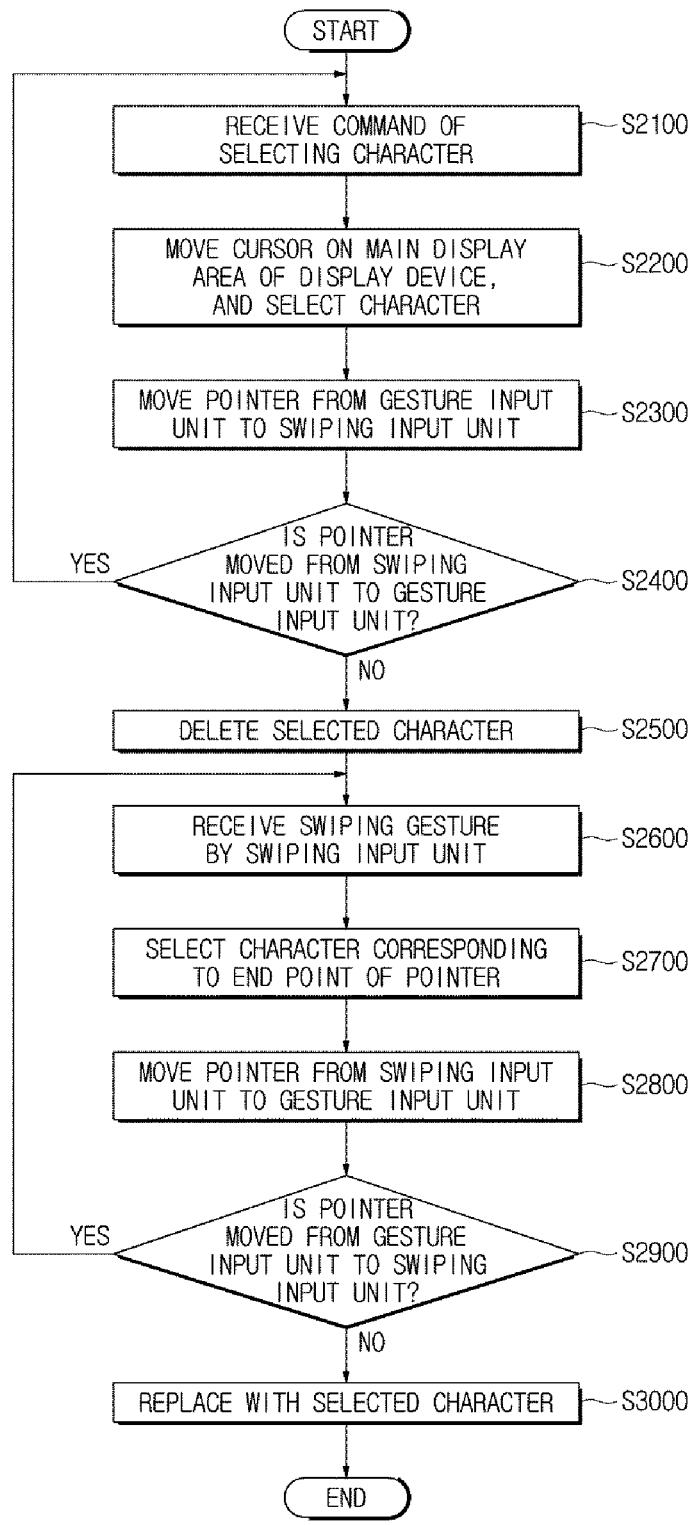
FIG. 20 is a control flow chart of a touch input device to delete or replace a character by using a touch input device in accordance with a first embodiment in the present disclosure.

FIG. 19 is a control flow chart of a touch input device to input a character by using a touch input device in accordance with a first embodiment in the present disclosure and FIG. 20 is a control flow chart of a touch input device to delete or replace a character by using a touch input device in accordance with a first embodiment in the present disclosure.

To avoid duplicate description, hereinafter a detail description of each component included in the touch input device 200 will be omitted.

Referring to FIG. 19, the swiping input unit 220 of the touch input unit 200 may receive an input of a rolling or a spin gesture that is a swiping gesture (S1100). Herein, receiving an input of a rolling or a spin gesture may represent receiving an input of a pointer while the pointer is kept in touch.

The controller may select a character corresponding to an end point of the pointer, among characters arranged on the display device 500 (S1200). The character arranged on the display device 500 may be a letter, a number or symbol, e.g., Korean consonants/vowels, alphabet, Arabic numerals or arithmetic symbols.

The character may be arranged to be circular shape on the swiping display area 520 of the display device 500 to correspond to a swiping gesture input method, which is drawing a circle.

The selected character may be highlighted on the swiping display area 520 to be clearly displayed for a user. For example, the selected character may be displayed to be thicker or highlighted.

The controller may detect that the pointer is moved from the swiping input unit 220 to the gesture input unit 210 while the pointer is kept in touch (S1300).

When the pointer is moved from the gesture input unit 210 to the swiping input unit 220 again while the pointer is kept in touch (YES of S1400), the swiping input unit 220 may again receive an input of a rolling or a spin gesture, that is a swiping, from a user (S1100).

When the pointer is away from the gesture input unit 210 (NO of S1400), the controller may determine that the selected character is input (S1500). The input character may be stored in the memory after being converted into an input signal and then displayed on the main display area 510 of the display device 500.

As mentioned above, when a method of inputting character is performed by the touch input device 200, the user may easily and intuitively input a character intended to be input. In this case, the user may easily input a character while looking at the display device without looking at the touch input unit, and may input a precise character to a correct position. Accordingly recognition rate may be improved.

When using the touch input device 200 according to a first embodiment, deleting or replacing character may be performed as well as inputting character. Hereinafter, a method of deleting and replacing character will be described with reference to FIG. 20.

The touch input device 200 may receive an input of a gesture or a command configured to select any character among characters, which are previously input from the user (S2100).

The controller may move a cursor on the main display area 510 of the display device 500 in a direction of input gesture, and the selected character may be moved according to the movement of the cursor (S2200).

For example, when the user performs a flicking gesture from the right side of the gesture input unit 210 to the left side of the gesture input unit 210, the controller may move the cursor displayed on the main display area 510 to the left side.

When the user performs a flicking gesture from the up side of the gesture input unit 210 to the down side of the gesture input unit 210, the controller may move the cursor displayed on the main display area 510 to the down side.

The gesture direction may include a variety of directions, e.g., upward, downward, leftward, rightward, and diagonal direction, and thereby a cursor displayed on the main display area 510 may be moved to correspond to the gesture direction.

The controller may detect that the pointer is moved from the gesture input unit 210 to the swiping input unit 220 while the pointer is kept in touch (S2300).

When the pointer is moved from the swiping input unit 220 from the gesture input unit 210 again and then the pointer is away (YES of S2400), deleting character may be canceled and the gesture input unit 210 may again receive an input of the flicking gesture from the user (S2100).

When the pointer is away from the swiping input unit 220 (NO of S2400), the controller may determine that the selected character is deleted (S2500). The deleted character may be deleted on the main display area 510 of the display device 500.

As mentioned above, by using the flicking gesture, the user may selectively delete a character among characters, which are previously input.

In addition, the character may be replaced as well as deleted, and thus the swiping input unit 220 of the touch input device 200 may receive an input of a rolling or a spin gesture, that is a swiping, from the user (S2600). Herein receiving an input of a rolling or a spin gesture may represent receiving an input of a pointer while the pointer is kept in touch.

The controller may select a character corresponding to an end point of the pointer, among characters arranged on the display device 500 (S2700).

The controller may detect that the pointer is moved from the swiping input unit 220 to the gesture input unit 210 while the pointer is kept in touch (S2800).

When the pointer is moved from the gesture input unit 210 to the swiping input unit 220 again while the pointer is kept in touch (YES of S2900), the swiping input unit 220 may receive again an input of the rolling or the spin gesture from the user (S2600).

When the pointer is away from the gesture input unit 210 (NO of S2900), the controller may replace a character, which is previously input, with a selected character (S3000). The replaced character may be displayed on the main display area 510 of the display device 500.

When a method of deleting or replacing character by using the touch input unit 200 is performed, the user may easily and intuitively select and input a character, which is intended to be deleted or replaced. In this case, the user may operate the touch input device 200 to delete or replace a character without looking at the touch input unit.

As is apparent from the above description, according to the proposed touch input device and the control method of the same, a user may input a character by using the touch input device without looking at the touch input unit, which is looking at the display device or looking forward.

In addition, the user may intuitively recognize that the finger is placed in which position of the touch input by using a sense of inclination felt by the finger.

Therefore the user may easily input a character while looking at the display device without looking at the touch input unit to input a character, and may input a precise character to a correct position. Accordingly the recognition rate may be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A touch input device connected to a display device in a vehicle comprising:
    a swiping input unit and a gesture input unit that include a touch pad to receive a touch input from a user;
    wherein the swiping input unit and the gesture input unit are provided in a circular shape, the gesture input has a concave shape and disposed on a center, the swiping input unit comprising a plurality of scales formed to be engraved or embossed that surrounds a circumference of the gesture input unit and is inclined downward, and
    wherein the display device includes a main display area and a swiping display area, characters are arranged in circular shape on the swiping display area that corresponds to a swiping input on the swiping input unit;
    the controller is configured to:
    receive a selection of a character through a swiping gesture input in the swiping input unit;
    receive a touch input, which is performed from the swiping input to the gesture input unit, to move a contact of a pointer from the swiping input unit to the gesture input unit to input the selected character;
    determine an operation signal corresponding to the touch input including a pressing gesture or a tilting gesture, when the pressing gesture or the tilting gesture is input from the swiping input and the gesture input;
    transmit the control signal to the display device, wherein the display device displays the selected character corresponding to the certain control signal;
    receive a selectin of another character through another swiping gesture in the swiping input unit;
    receive an input of flicking gesture from the user by moving a contact of a pointer from the swiping input unit to the gesture input unit, and then taking off the contact of the pointer; and
    replace the character displayed on the main display area of the display device with the selected another character on the main display area.

2. The touch input device of claim 1, wherein
the controller is configured to determine that the selected character is input when the flicking gesture is input from the swiping input to the gesture input unit in order to display the selected character in the main display area of the display device.

3. The touch input device of claim 1, wherein
the swiping input is configured to receive the selection of the character corresponding to an end point of the swiping gesture input from the user.

4. The touch input device of claim 1, wherein
the display device displays the selected character to be highlighted on the swiping display area.

5. The touch input device of claim 1, wherein
the controller is configured to delete an input character when a gesture is input from the gesture input unit to the swiping input.

6. The touch input device of claim 1, further comprising:
the display device, wherein the swiping input receives an input of flicking gesture from the user, and the controller is configured to move a cursor displayed on the swiping display area of the display device according to a direction of the flicking gesture, which is input to the gesture input unit.

7. The touch input device of claim 1, further comprising:
an edge unit surrounding the swiping input unit and the gesture input unit, wherein the edge unit includes touch buttons to input a gesture to the swiping input unit and the gesture input unit.

8. A control method of a touch input device connected to a display device in a vehicle comprising steps of:
    receiving, by a swiping input unit including a touch pad, a selection of a character through a swiping gesture from a user;
    receiving a touch gesture, which is performed from the swiping input to a gesture input unit to input the selected character,
    wherein the swiping input unit and the gesture input unit are provided in a circular shape, the gesture input has a concave shape and disposed on a center, the swiping input unit comprising a plurality of scales formed to be engraved or embossed that surrounds a circumference of the gesture input unit and is inclined downward, and wherein the display device includes a main display area and a swiping display area, characters are arranged in circular shape on the swiping display area that corresponds to a swiping input on the swiping input unit;

determining an operation signal corresponding to the touch input including a pressing gesture or a tilting gesture, when the pressing gesture or the tilting gesture is input from the swiping input and the gesture input;

transmitting the control signal to the display device, wherein the display device displays the selected character corresponding to the certain control signal;

selecting another character corresponding to another swiping gesture when the swiping input receives the other swiping gesture;

receiving an input of flicking gesture from the user by moving a contact of a pointer from the swiping input unit to the gesture input unit, and then taking off the contact of the pointer; and replacing the character displayed on the main display area of the display device with the selected another character on the main display area.

9. The control method of claim 8, wherein
the step of displaying the selected character to be highlighted.

10. The control method of claim 8, further comprising:
receiving an input a gesture performed from the gesture input unit to the swiping input, and deleting an input character.

11. The control method of claim 8, further comprising:
receiving by the gesture input unit an input of a flicking gesture; and
moving a cursor displayed on a display device, according to a direction of the flicking gesture.

12. The control method of claim 8, wherein
the step of receiving the selection of the character comprises a receiving by the swiping input unit an input of the swiping gesture; and
moving a cursor displayed on the swiping display area of display device, according to a direction of the swiping gesture.

13. The control method of claim 8, further comprising:
storing the inputted character.

* * * * *